(12) United States Patent
Lee et al.

(10) Patent No.: US 12,271,556 B2
(45) Date of Patent: Apr. 8, 2025

(54) DISPLAY DEVICE

(71) Applicant: SAMSUNG DISPLAY CO., LTD., Yongin-si (KR)

(72) Inventors: Hyojin Lee, Yongin-si (KR); Soongyu Lee, Yongin-si (KR); Jinwoo Kim, Yongin-si (KR); Woomi Bae, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/451,417

(22) Filed: Aug. 17, 2023

(65) Prior Publication Data

US 2024/0143113 A1     May 2, 2024

(30) Foreign Application Priority Data

Oct. 31, 2022    (KR) .................. 10-2022-0142624

(51) Int. Cl.
*G06F 3/041*     (2006.01)
*G06F 3/044*     (2006.01)

(52) U.S. Cl.
CPC ........ G06F 3/04182 (2019.05); G06F 3/0446 (2019.05); *G06F 2203/04108* (2013.01)

(58) Field of Classification Search
CPC ........................... G06F 3/04182; G06F 3/0446
See application file for complete search history.

(56) References Cited

U.S. PATENT DOCUMENTS

| | | | |
|---|---|---|---|
| 9,535,545 B2 | 1/2017 | Brunet et al. | |
| 11,204,667 B1 | 12/2021 | Jordan | |
| 11,231,810 B2 | 1/2022 | Kim et al. | |
| 11,307,708 B2 | 4/2022 | Kim et al. | |
| 2011/0057890 A1* | 3/2011 | Goo | G06F 3/04182 345/173 |
| 2014/0354567 A1 | 12/2014 | Park et al. | |
| 2015/0002445 A1* | 1/2015 | Brunet | G06F 3/0443 345/174 |
| 2016/0378265 A1* | 12/2016 | Katsurahira | G06F 3/0442 345/174 |
| 2019/0163295 A1* | 5/2019 | Vandermeijden | G06F 3/044 |

FOREIGN PATENT DOCUMENTS

| | | |
|---|---|---|
| KR | 10-2014-0140891 | 12/2014 |
| KR | 10-2021-0003986 | 1/2021 |
| KR | 10-2021-0010724 | 1/2021 |
| KR | 10-2022-0044149 | 4/2022 |

* cited by examiner

*Primary Examiner* — Ryan A Lubit
(74) *Attorney, Agent, or Firm* — F. Chau & Associates, LLC

(57) ABSTRACT

A display device includes a display panel, an input sensor operating in an input sensing mode or a proximity sensing mode, a sensor controller driving the input sensor in the input sensing mode or the proximity sensing mode, and a main controller controlling driving of the sensor controller. The input sensor includes a sensing area and a non-sensing area. The sensing area is divided into a proximity sensing area and a plurality of reference areas in the proximity sensing mode. The main controller generates a noise control signal based on a plurality of reference sensing signals sensed in the reference areas, and determines whether an object is in proximity based on the noise control signal and a proximity sensing signal sensed in the proximity sensing area.

18 Claims, 20 Drawing Sheets

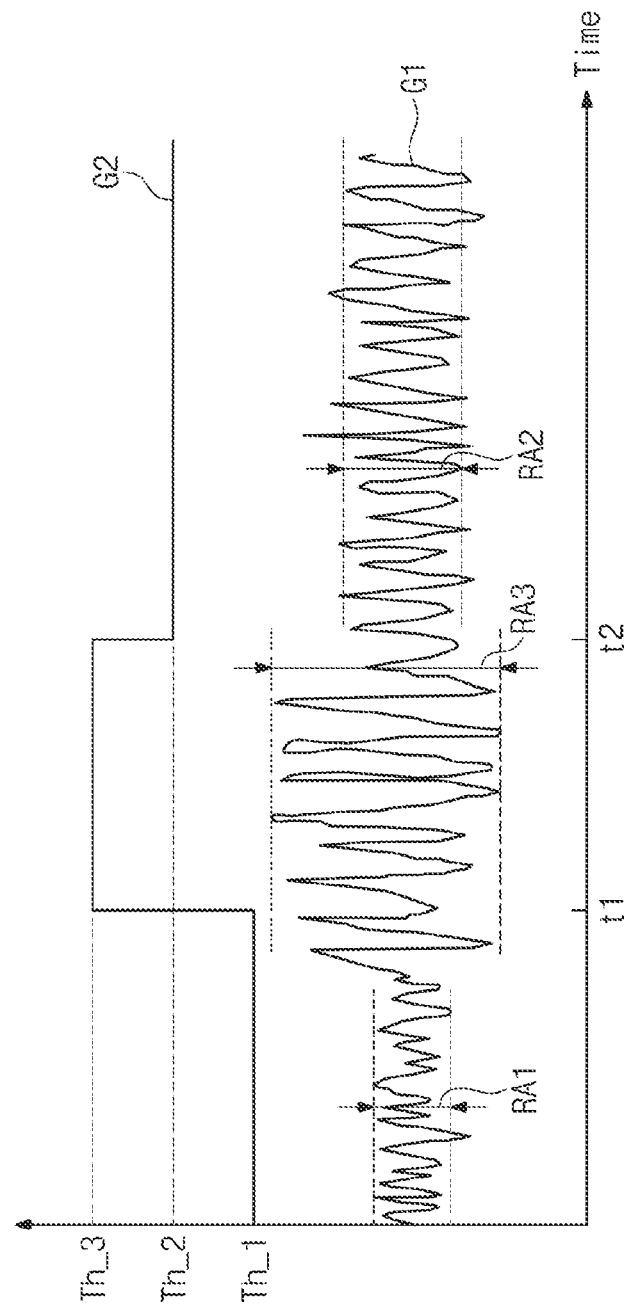

DISPLAY DEVICE

CROSS-REFERENCE TO RELATED APPLICATIONS

This U.S. non-provisional patent application claims priority under 35 U.S.C. § 119 to Korean Patent Application No. 10-2022-0142624, filed on Oct. 31, 2022, the disclosure of which is incorporated by reference herein in its entirety.

TECHNICAL FIELD

Embodiments of the present disclosure relate to a display device having a proximity sensing function.

DISCUSSION OF RELATED ART

Multimedia display devices, such as, for example, televisions, mobile phones, tablet computers, navigation units, and game units, typically include a display device that displays images. Such display devices may include an input sensor that provides a touch-based input method allowing users to easily and intuitively input information or commands in addition to other input methods such as, for example, a button, a keyboard, a mouse, etc.

SUMMARY

Embodiments of the present disclosure provide a display device having increased proximity sensing reliability.

Embodiments of the present disclosure provide a display device including a display panel that displays an image, an input sensor disposed on the display panel which operates in an input sensing mode or a proximity sensing mode, a sensor controller that drives the input sensor in the input sensing mode or the proximity sensing mode, and a main controller that controls driving of the sensor controller.

According to embodiments, the input sensor includes a sensing area and a non-sensing area, and the sensing area is divided into a proximity sensing area and a plurality of reference areas in the proximity sensing mode.

According to embodiments, the main controller generates a noise control signal based on a plurality of reference sensing signals sensed in the reference areas, and determines whether an object is in proximity based on the noise control signal and a proximity sensing signal sensed in the proximity sensing area.

Embodiments of the present disclosure provide a display device including a display panel that displays an image, an input sensor disposed on the display panel which operates in an input sensing mode or a proximity sensing mode, a sensor module including a plurality of sensors, a sensor controller that drives the input sensor in the input sensing mode or the proximity sensing mode, and a main controller that controls driving of the sensor controller.

According to embodiments, the main controller receives a proximity sensing signal sensed by the input sensor and an external sensing signal from the sensor module, and determines whether an object is in proximity based on the proximity sensing signal and the external sensing signal.

According embodiments of the present disclosure, a threshold value is adjusted depending on whether a noise occurs, a determiner circuit is able to accurately determine whether an object is in proximity regardless of the occurrence of the noise, and thus, proximity sensing reliability of the display device is improved.

BRIEF DESCRIPTION OF THE DRAWINGS

The above and other features of the present disclosure will become more apparent by describing in detail embodiments thereof with reference to the accompanying drawings, in which:

FIGS. 10A and 10B are waveform diagrams of variations of threshold values according to embodiments of the present disclosure;

DETAILED DESCRIPTION

Figure 1:
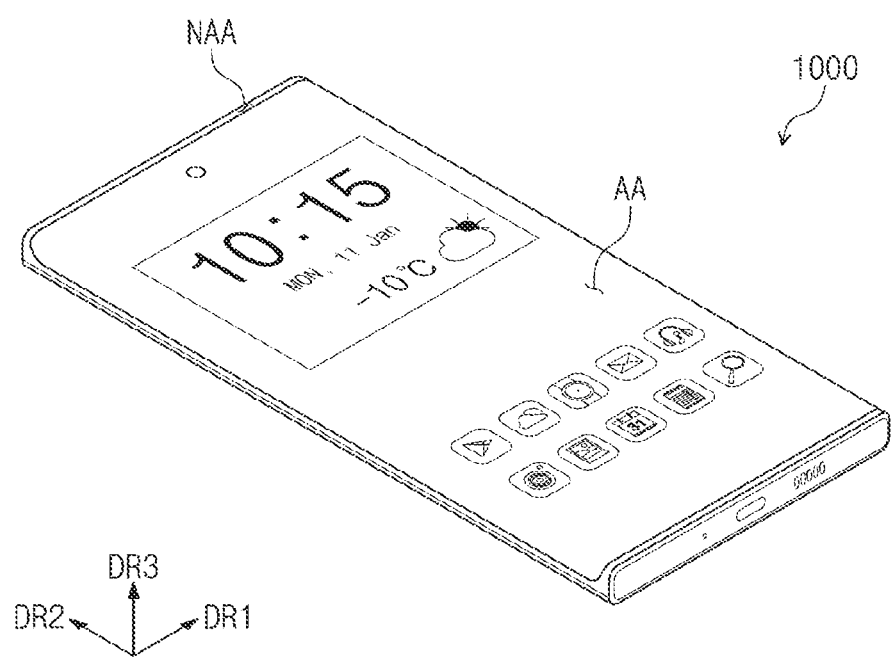
FIG. 1 is a perspective view of a display device according to an embodiment of the present disclosure.

Embodiments of the present disclosure will be described more fully hereinafter with reference to the accompanying drawings. Like reference numerals may refer to like elements throughout the accompanying drawings.

It will be understood that when a component such as a film, a region, a layer, etc., is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationships between components should be interpreted in a like fashion.

As used herein, the term "and/or" may include any and all combinations of one or more of the associated listed items.

It will be understood that the terms "first," "second," "third," etc. are used herein to distinguish one element from another, and the elements are not limited by these terms. Thus, a "first" element in an embodiment may be described as a "second" element in another embodiment.

As used herein, the singular forms, "a", "an" and "the" are intended to include the plural forms as well, unless the context clearly indicates otherwise.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below.

It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof.

It should be understood that descriptions of features or aspects within each embodiment should typically be considered as available for other similar features or aspects in other embodiments, unless the context clearly indicates otherwise.

FIG. 1 is a perspective view of a display device 1000 according to an embodiment of the present disclosure.

Referring to FIG. 1, the display device 1000 may be activated in response to electrical signals. The display device 1000 may be, for example, a mobile phone, a foldable mobile phone, a notebook computer, a television set, a tablet computer, a car navigation unit, a game unit, or a wearable device. However, the display device 1000 is not limited thereto. For example, although FIG. 1 illustrates a mobile phone as a representative example of the display device 1000, embodiments of the present disclosure are not limited thereto.

The display device 1000 may include an active area AA and a peripheral area NAA, which are defined therein. The display device 1000 may display an image in the active area AA. The active area AA may include a surface defined by a first direction DR1 and a second direction DR2. The peripheral area NAA may surround the active area AA.

A thickness direction of the display device 1000 may be substantially parallel to a third direction DR3 crossing the first and second directions DR1 and DR2. Accordingly, front (or upper) and rear (or lower) surfaces of each member of the display device 1000 may be defined with respect to the third direction DR3.

Figure 2:
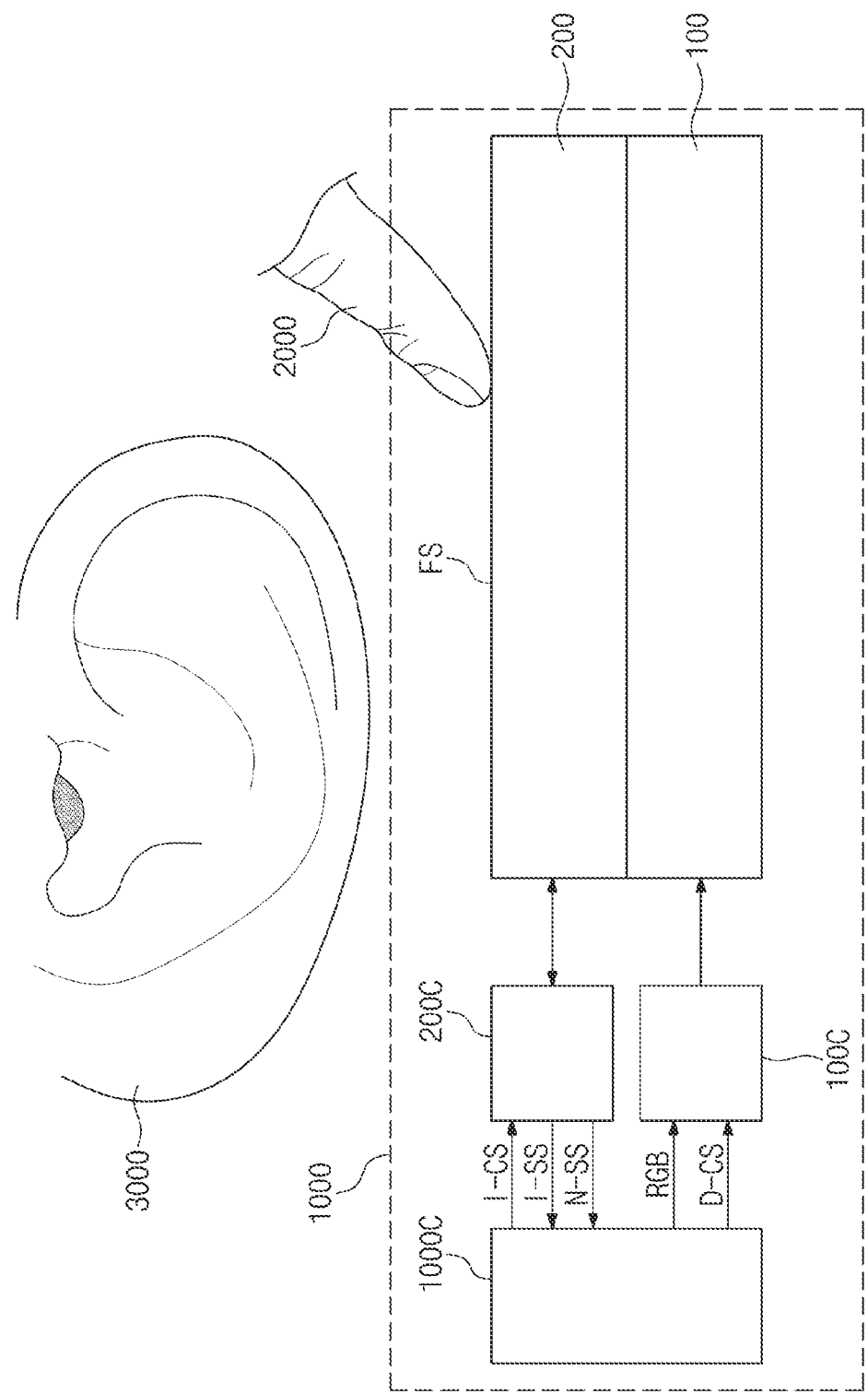
FIG. 2 is a view illustrating an operation of a display device according to an embodiment of the present disclosure.

FIG. 2 is a view illustrating an operation of the display device 1000 according to an embodiment of the present disclosure.

Referring to FIG. 2, the display device 1000 may include a display panel 100, an input sensor 200 (also referred to as an input sensor circuit), a panel driver 100C (also referred to as a panel driver circuit), a sensor controller 200C (also referred to as a sensor controller circuit), and a main controller 1000C (also referred to as a main controller circuit).

The display panel 100 may have a configuration allowing the display panel 100 to generate the image. The display panel 100 may be, for example, a light emitting type display panel. For example, the display panel 100 may be an organic light emitting display panel, an inorganic light emitting display panel, a quantum dot display panel, a micro-LED display panel, or a nano-LED display panel. However, the display panel 100 is not limited thereto.

The input sensor 200 may be disposed on the display panel 100. The input sensor 200 may sense an external input 2000 applied thereto from outside of the display device 1000. The external input 2000 may include inputs generated by an input device that causes a variation in capacitance. As an example, the input sensor 200 may sense not only an input generated by a passive type input device such as a user's body (e.g., a finger), but also an input generated by an active type input device that transmits and receives a signal.

The main controller 1000C may control an overall operation of the display device 1000. For example, the main controller 1000C may control an operation of the panel driver 100C and the sensor controller 200C. The main controller 1000C may include at least one microprocessor, and the main controller 1000C may be referred to as a host. The main controller 1000C may further include a graphics controller.

The panel driver 100C may control driving of the display panel 100. The panel driver 100C may receive image data RGB and a display control signal D-CS from the main controller 1000C. The display control signal D-CS may include a variety of signals. For example, the display control signal D-CS may include a vertical synchronization signal, a horizontal synchronization signal, a main clock, and a data enable signal. The panel driver 100C may generate a scan control signal and a data control signal based on the display control signal D-CS that controls the drive of the display panel 100.

The sensor controller 200C may control driving of the input sensor 200. The sensor controller 200C may receive a sensing control signal I-CS from the main controller 1000C. The sensing control signal I-CS may include a mode determination signal that determines a driving mode of the sensor controller 200C and a clock signal. The main controller 1000C may provide a signal of the display control signal D-CS, e.g., the vertical synchronization signal, to the sensor controller 200C in addition to the sensing control signal I-CS.

The sensor controller 200C may calculate coordinate information of the input based on the signal from the input sensor 200 and may apply a coordinate signal I-SS having the coordinate information to the main controller 1000C. The main controller 1000C may perform an operation corresponding to the user's input based on the coordinate signal I-SS. For example, the main controller 1000C may drive the panel driver 100C based on the coordinate signal I-SS such that the display panel 100 may display a new application image.

The sensor controller 200C may sense an approach of an object 3000 getting close to a surface FS of the display device 1000 based on the signal received from the input sensor 200. FIG. 2 shows a user's ear approaching the display device 1000 as an example of the object 3000. However, the object 3000 may be another part, such as, for example, a user's face. The sensor controller 200C may provide a proximity sensing signal N-SS including proximity object sensing information to the main controller 1000C. The main controller 1000C may reduce a luminance of the image displayed through the display panel 100 based on the proximity sensing signal N-SS or may operate the panel driver 100C such that the image is not displayed through the display panel 100. As an example, the main controller 1000C may turn off a screen of the display device 1000 based on the proximity sensing signal N-SS.

Figure 3A:
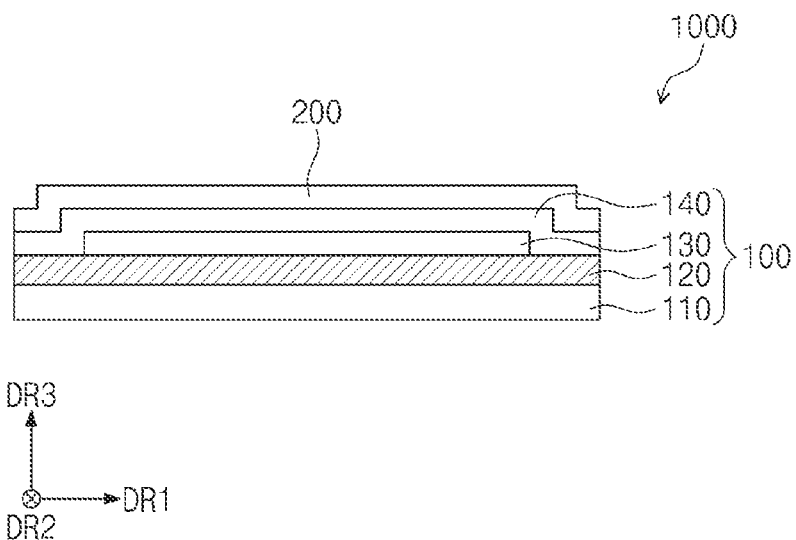
FIG. 3A is a cross-sectional view of a display device according to an embodiment of the present disclosure.

FIG. 3A is a cross-sectional view of the display device 1000 according to an embodiment of the present disclosure.

Referring to FIG. 3A, the display device 1000 may include the display panel 100 and the input sensor 200. The display panel 100 may include a base layer 110, a circuit layer 120, a light emitting element layer 130, and an encapsulation layer 140.

The base layer 110 may provide a base surface on which the circuit layer 120 is disposed. The base layer 110 may be, for example, a glass substrate, a metal substrate, or a polymer substrate. However, embodiments of the present disclosure are not limited thereto. For example, according to embodiments, the base layer 110 may be an inorganic layer, an organic layer, or a composite material layer.

The base layer 110 may have a multi-layer structure. For example, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a base barrier layer.

Each of the first and second synthetic resin layers may include a polyimide-based resin. In addition, each of the first and second synthetic resin layers may include, for example, at least one of an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, and a perylene-based resin.

The circuit layer 120 may be disposed on the base layer 110. The circuit layer 120 may include, for example, an insulating layer, a semiconductor pattern, a conductive pattern, and a signal line. An insulating layer, a semiconductor layer, and a conductive layer may be formed on the base layer 110 by a coating or depositing process, and the insulating layer, the semiconductor layer, and the conductive layer may be selectively patterned through several photolithography processes. Then, the semiconductor pattern, the conductive pattern, and the signal line included in the circuit layer 120 may be formed.

The light emitting element layer 130 may be disposed on the circuit layer 120. The light emitting element layer 130 may include a light emitting element. For example, the light emitting element layer 130 may include an organic light emitting material, an inorganic light emitting material, a quantum dot, a quantum rod, a micro-LED, or a nano-LED.

The encapsulation layer 140 may be disposed on the light emitting element layer 130. The encapsulation layer 140 may protect the light emitting element layer 130 from moisture, oxygen, and a foreign substance such as dust particles.

The input sensor 200 may be disposed on the display panel 100. The input sensor 200 may sense the external input 2000 (refer to FIG. 2) applied thereto. The external input 2000 may be the user's input. The user's input may include various forms of external inputs, such as, for example, a touch by a part of the user's body, light, heat, pen, or pressure.

The input sensor 200 may be formed on the display panel 100 through successive processes. In this case, the input sensor 200 may be disposed directly on the display panel 100. In the following descriptions, the expression "the input sensor 200 is disposed directly on the display panel 100" means that no intervening elements are present between the input sensor 200 and the display panel 100. That is, when this expression is used, a separate adhesive member is not disposed between the input sensor 200 and the display panel 100. However, embodiments of the present disclosure are not limited thereto. For example, according to embodiments, the input sensor 200 may be coupled with the display panel 100 by an adhesive member. The adhesive member may be a conventional adhesive.

According to embodiments, the display device 1000 may further include an anti-reflective layer and an optical layer, which are disposed above the input sensor 200. The anti-reflective layer may reduce a reflectance with respect to an external light incident to the display device 1000 from outside of the display device 1000. The optical layer may control a traveling direction of the light incident thereto from the display panel 100, and thus, a front luminance of the display device 1000 may be improved.

Figure 3B:
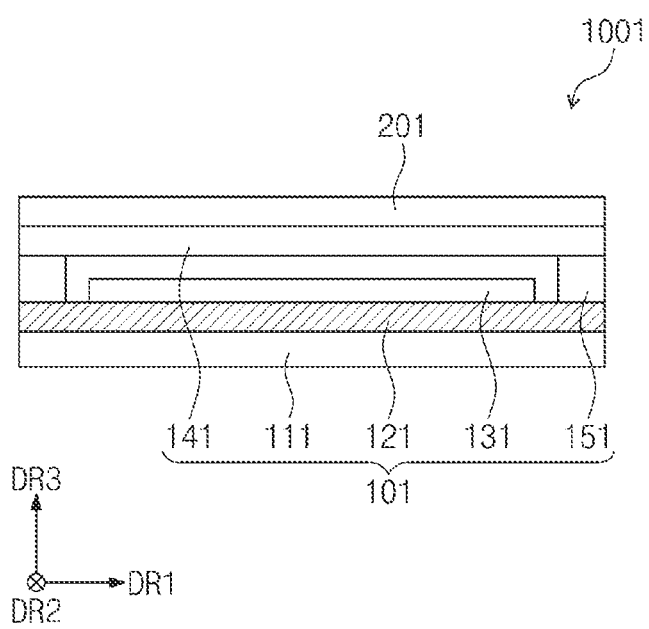
FIG. 3B is a cross-sectional view of a display device according to an embodiment of the present disclosure.

FIG. 3B is a cross-sectional view of a display device 1001 according to an embodiment of the present disclosure.

Referring to FIG. 3B, the display device 1001 may include a display panel 101 and an input sensor 201. The display panel 101 may include a base substrate 111, a circuit layer 121, a light emitting element layer 131, an encapsulation substrate 141, and a coupling member 151.

Each of the base substrate 111 and the encapsulation substrate 141 may be, for example, a glass substrate, a metal substrate, or a polymer substrate. However, embodiments of the present disclosure are not limited thereto.

The coupling member 151 may be disposed between the base substrate 111 and the encapsulation substrate 141. The encapsulation substrate 141 may be coupled with the base substrate 111 or the circuit layer 121 by the coupling member 151. The coupling member 151 may include an inorganic material or an organic material. For example, the inorganic material may include a frit seal, and the organic material may include a photo-curable resin or a photo-plastic resin. However, the material of the coupling member 151 is not limited thereto.

The input sensor 201 may be disposed directly on the encapsulation substrate 141. In the following descriptions, the expression "the input sensor 201 is disposed directly on the encapsulation substrate 141" means that no intervening elements are present between the input sensor 201 and the encapsulation substrate 141. That is, when this expression is used, a separate adhesive member is not disposed between the input sensor 201 and the encapsulation substrate 141. However, embodiments of the present disclosure are not limited thereto. For example, according to embodiments, an adhesive member may be further disposed between the input sensor 201 and the encapsulation substrate 141.

Figure 4:
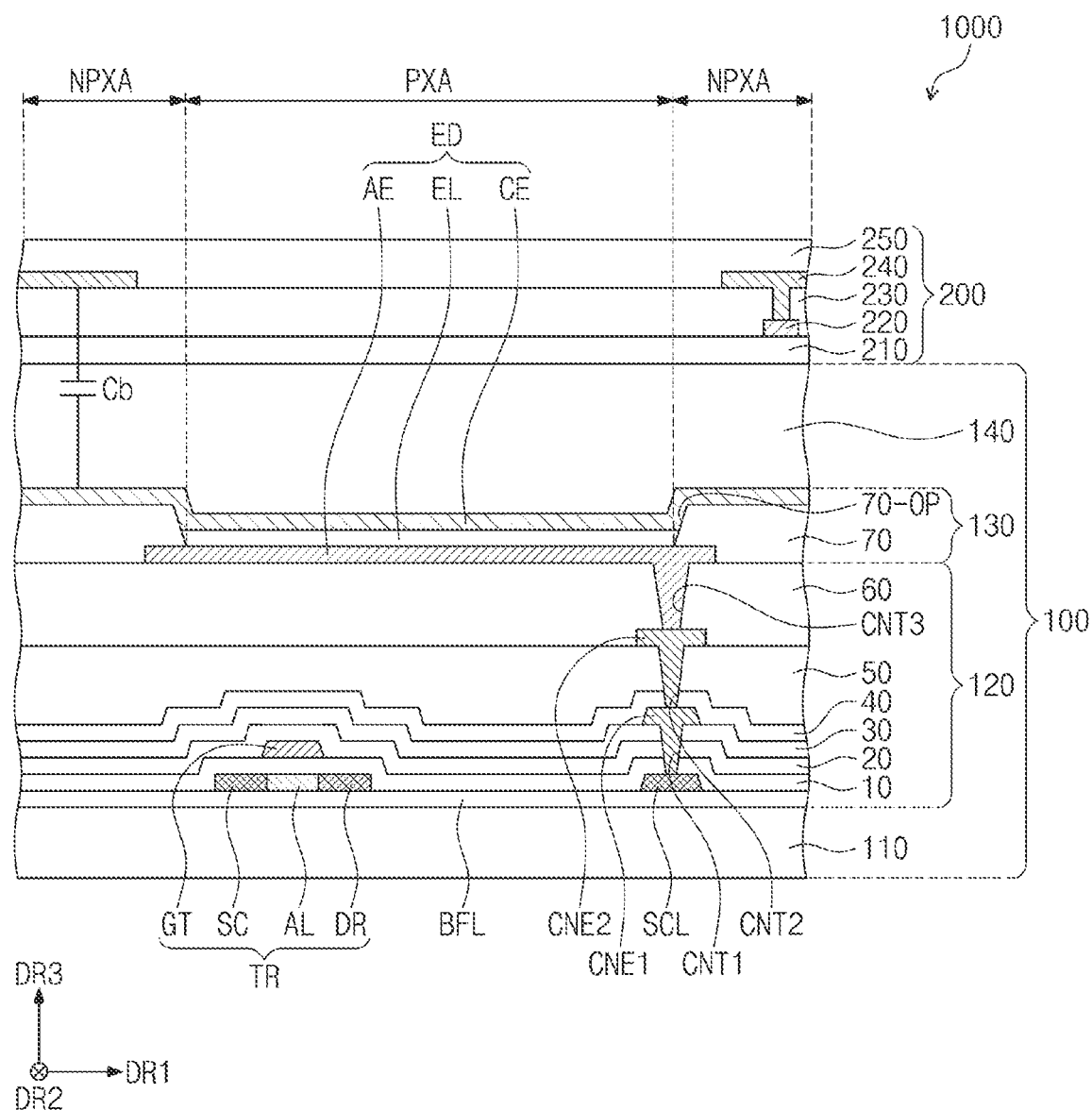
FIG. 4 is a cross-sectional view of a display device according to an embodiment of the present disclosure.

FIG. 4 is a cross-sectional view of the display device 1000 according to an embodiment of the present disclosure.

Referring to FIG. 4, at least one inorganic layer may be formed on an upper surface of the base layer 110. The inorganic layer may include at least one of, for example, aluminum oxide, titanium oxide, silicon oxide, silicon nitride, silicon oxynitride, zirconium oxide, and hafnium oxide. The inorganic layer may be formed in multiple layers. The inorganic layers formed in multiple layers may form a barrier layer and/or a buffer layer. In an embodiment, the display panel 100 may further include a buffer layer BFL.

The buffer layer BFL may increase adhesion between the base layer 110 and the semiconductor pattern. The buffer layer BFL may include at least one of, for example, silicon oxide, silicon nitride, and silicon oxynitride. The buffer layer BFL may have a stack structure in which a silicon oxide layer and a silicon nitride layer are alternately stacked.

The semiconductor pattern may be disposed on the buffer layer BFL. The semiconductor pattern may include polysilicon. However, embodiments of the present disclosure are not limited thereto. The semiconductor pattern may include, for example, amorphous silicon, low-temperature polycrystalline silicon, or oxide semiconductor.

FIG. 4 shows only a portion of the semiconductor pattern. The semiconductor pattern may be further disposed in other areas not illustrated in FIG. 4. The semiconductor pattern may be arranged with a specific rule over a plurality of pixels. The semiconductor pattern may have different electrical properties depending on whether it is doped or not doped, or whether it is doped with an N-type dopant or a P-type dopant. The semiconductor pattern may include a first region with high conductivity and a second region with low conductivity. The first region may be doped with the N-type dopant or the P-type dopant. A P-type transistor may include a doped region doped with the P-type dopant, and an N-type transistor may include a doped region doped with the N-type dopant. The second region may be a non-doped region or may be doped at a concentration lower than the first region.

The first region may have a conductivity greater than that of the second region and may substantially serve as an electrode or signal line. The second region may substantially correspond to an active (or a channel) of a transistor. In other words, a portion of the semiconductor pattern may be the active of the transistor, another portion of the semiconductor pattern may be a source or a drain of the transistor, and the other portion of the semiconductor pattern may be a connection electrode or a connection signal line.

Each pixel may have an equivalent circuit that includes seven transistors, one capacitor, and a light emitting element ED, and the equivalent circuit of each pixel may be changed in various ways. FIG. 4 shows one transistor TR and the light emitting element ED included in the pixel.

A source SC, a channel AL, and a drain DR of the transistor TR may be formed from the semiconductor pattern. The source SC and the drain DR may extend in opposite directions to each other from the channel AL in a cross-section. FIG. 4 shows a portion of a connection signal line SCL formed from the semiconductor pattern. According to embodiments, the connection signal line SCL may be electrically connected to the drain DR of the transistor TR in a plane.

A first insulating layer 10 may be disposed on the buffer layer BFL. The first insulating layer 10 may commonly overlap the pixels and may cover the semiconductor pattern.

The first insulating layer 10 may be an inorganic layer and/or an organic layer and may have a single-layer or multi-layer structure. The first insulating layer 10 may include at least one of, for example, aluminum oxide, titanium oxide, silicon oxide, silicon nitride, silicon oxynitride, zirconium oxide, and hafnium oxide. In an embodiment, the first insulating layer 10 may have a single-layer structure of a silicon oxide layer. Not only the first insulating layer 10, but also an insulating layer of the circuit layer 120 described below may be an inorganic layer and/or an organic layer and may have a single-layer or multi-layer structure. The inorganic layer may include at least one of the above-mentioned materials. However, the material(s) of the inorganic layer are not limited thereto.

A gate GT of the transistor TR may be disposed on the first insulating layer 10. The gate GT may be a portion of a metal pattern. The gate GT may overlap the channel AL. The gate GT may be used as a mask in a process of doping the semiconductor pattern.

A second insulating layer 20 may be disposed on the first insulating layer 10 and may cover the gate GT. The second insulating layer 20 may commonly overlap the pixels. The second insulating layer 20 may be an inorganic layer and/or an organic layer and may have a single-layer or multi-layer structure. The second insulating layer 20 may include at least one of, for example, silicon oxide, silicon nitride, and silicon oxynitride. In an embodiment, the second insulating layer 20 may have a multi-layer structure of a silicon oxide layer and a silicon nitride layer.

A third insulating layer 30 may be disposed on the second insulating layer 20. The third insulating layer 30 may have a single-layer structure or a multi-layer structure. As an example, the third insulating layer 30 may have the multi-layer structure of a silicon oxide layer and a silicon nitride layer.

A first connection electrode CNE1 may be disposed on the third insulating layer 30. The first connection electrode CNE1 may be connected to the connection signal line SCL via a contact hole CNT1 defined through the first, second, and third insulating layers 10, 20, and 30.

A fourth insulating layer 40 may be disposed on the third insulating layer 30. The fourth insulating layer 40 may have a single-layer structure of a silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 via a contact hole CNT2 defined through the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 130 may be disposed on the circuit layer 120. The light emitting element layer 130 may include the light emitting element ED. For example, the light emitting element layer 130 may include an organic light emitting material, an inorganic light emitting material, a quantum dot, a quantum rod, a micro-LED, or a nano-LED. Hereinafter, the organic light emitting element will be described as the light emitting element ED. However, the light emitting element ED is not limited thereto.

The light emitting element ED may include a first electrode AE, a light emitting layer EL, and a second electrode CE. The first electrode AE may be disposed on the sixth insulating layer 60. The first electrode AE may be connected to the second connection electrode CNE2 via a contact hole CNT3 defined through the sixth insulating layer 60.

A pixel definition layer 70 may be disposed on the sixth insulating layer 60 and may cover a portion of the first electrode AE. An opening 70-OP may be defined through the pixel definition layer 70. At least a portion of the first electrode AE may be exposed through the opening 70-OP of the pixel definition layer 70.

The active area AA (refer to FIG. 1) may include a light emitting area PXA and a non-light-emitting area NPXA adjacent to the light emitting area PXA. The non-light-emitting area NPXA may surround the light emitting area PXA. In an embodiment, the light emitting area PXA may correspond to a portion of the first electrode AE exposed through the opening 70-OP.

The light emitting layer EL may be disposed on the first electrode AE. The light emitting layer EL may be disposed in an area corresponding to the opening 70-OP. That is, the light emitting layer EL may be formed in each of the pixels after being divided into a plurality of portions. In a case in which the light emitting layer EL is formed in each of the pixels after being divided into a plurality of portions, each of the light emitting layers EL may emit a light having at least one of blue, red, and green colors. However, embodiments of the present disclosure are not limited thereto. The light emitting layers EL may be provided integrally with each other and may be commonly provided in the pixels. In this case, the light emitting layers EL provided integrally with each other may provide a blue light or a white light.

The second electrode CE may be disposed on the light emitting layer EL. The second electrode CE may have an integral shape and may be commonly disposed over the pixels.

According to embodiments, a hole control layer may be disposed between the first electrode AE and the light emitting layer EL. The hole control layer may be commonly disposed in the light emitting area PXA and the non-light-emitting area NPXA. The hole control layer may include a hole transport layer and may further include a hole injection layer. An electron control layer may be disposed between the light emitting layer EL and the second electrode CE. The electron control layer may include an electron transport layer and may further include an electron injection layer. The hole control layer and the electron control layer may be commonly formed in the plurality of pixels using an open mask.

The encapsulation layer 140 may be disposed on the light emitting element layer 130. The encapsulation layer 140 may include, for example, an inorganic layer, an organic layer, and an inorganic layer, which are sequentially stacked. However, the layers of the encapsulation layer 140 are not limited thereto.

The inorganic layers may protect the light emitting element layer 130 from moisture and oxygen, and the organic layer may protect the light emitting element layer 130 from a foreign substance such as dust particles. Each of the inorganic layers may include, for example, a silicon nitride layer, a silicon oxynitride layer, a silicon oxide layer, a titanium oxide layer, or an aluminum oxide layer. The organic layer may include, for example, an acrylic-based organic layer. However, the organic layer is not limited thereto.

The input sensor 200 may include a base insulating layer 210, a first conductive layer 220, a sensing insulating layer 230, a second conductive layer 240, and a cover insulating layer 250.

The base insulating layer 210 may be an inorganic layer that includes at least one of, for example, silicon nitride, silicon oxynitride, and silicon oxide. Alternatively, the base insulating layer 210 may be an organic layer that includes, for example, an epoxy-based resin, an acrylic-based resin, or an imide-based resin. The base insulating layer 210 may have a single-layer structure or a multi-layer structure of layers stacked one on another in the third direction DR3.

Each of the first conductive layer 220 and the second conductive layer 240 may have a single-layer structure or a multi-layer structure of layers stacked in the third direction DR3.

The conductive layer having the single-layer structure may include a metal layer or a transparent conductive layer. The metal layer may include, for example, molybdenum, silver, titanium, copper, aluminum, or alloys thereof. The transparent conductive layer may include a transparent conductive oxide, such as, for example, indium tin oxide (ITO), indium zinc oxide (IZO), zinc oxide (ZnO), indium zinc tin oxide (ITZO), or the like. In addition, the transparent conductive layer may include a conductive polymer such as, for example, PEDOT, a metal nanowire, a graphene, or the like.

The conductive layer having the multi-layer structure may include metal layers. The metal layers may have, for example, a three-layer structure of titanium/aluminum/titanium. The conductive layer having the multi-layer structure may include at least one metal layer and at least one transparent conductive layer.

At least one of the sensing insulating layer 230 and the cover insulating layer 250 may include an inorganic layer. The inorganic layer may include at least one of, for example, aluminum oxide, titanium oxide, silicon oxide, silicon nitride, silicon oxynitride, zirconium oxide, and hafnium oxide.

At least one of the sensing insulating layer 230 and the cover insulating layer 250 may include an organic layer. The organic layer may include at least one of, for example, an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, and a perylene-based resin.

A parasitic capacitance Cb may be generated between the input sensor 200 and the second electrode CE. The parasitic capacitance Cb may be referred to as a base capacitance. As a distance between the input sensor 200 and the second electrode CE decreases, the parasitic capacitance Cb may increase. As the parasitic capacitance Cb increases, a ratio of variation in capacitance to a reference value may decrease. The variation in capacitance may be a value reflecting a variation in capacitance, which is caused by the external input 2000 by an input device, for example, the user's body, or a variation in capacitance, which is caused by the approach of the object 3000 (refer to FIG. 2).

Figure 5A:
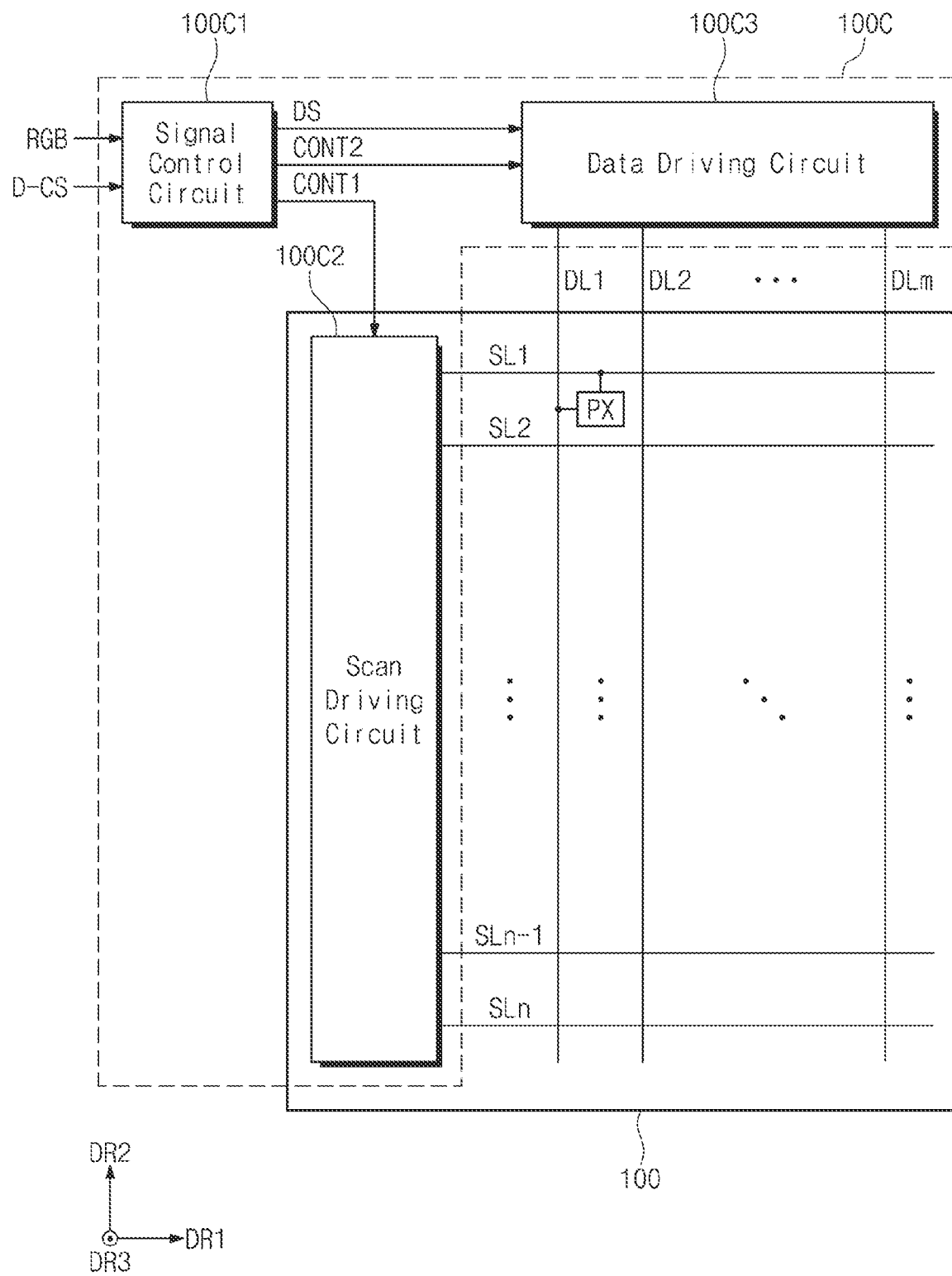
FIG. 5A is a block diagram of a display panel and a panel driver according to an embodiment of the present disclosure.
Figure 5B:
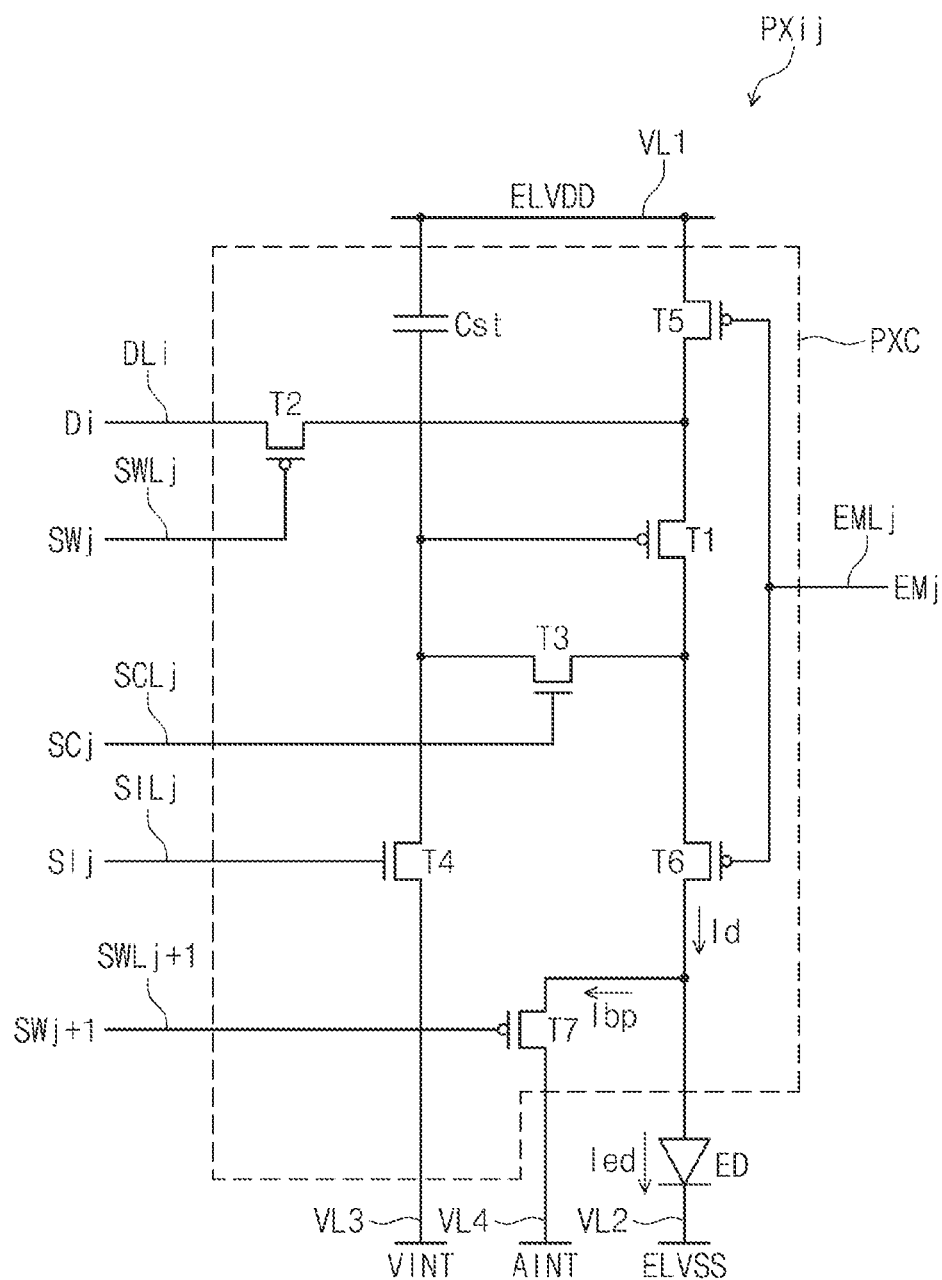
FIG. 5B is a circuit diagram of a pixel shown in FIG. 5A according to an embodiment of the present disclosure.
Figure 5C:
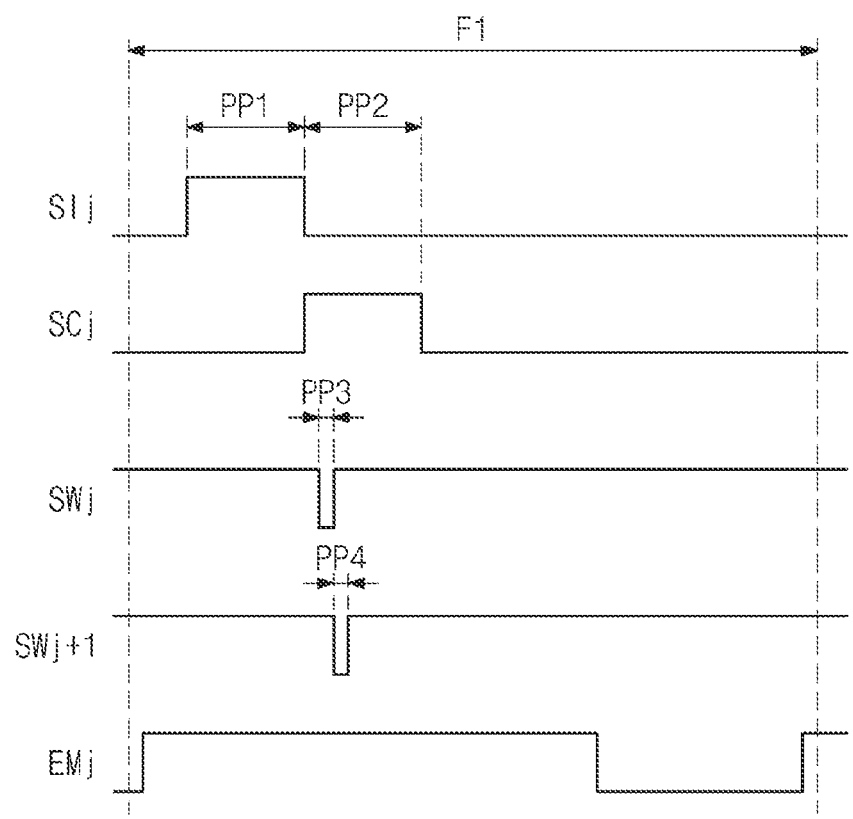
FIG. 5C is a timing diagram illustrating an operation of the pixel shown in FIG. 5B according to an embodiment of the present disclosure.

FIG. 5A is a block diagram of the display panel 100 and the panel driver 100C according to an embodiment of the present disclosure. FIG. 5B is a circuit diagram of a pixel shown in FIG. 5A according to an embodiment of the present disclosure. FIG. 5C is a timing diagram illustrating an operation of the pixel PXij shown in FIG. 5B according to an embodiment of the present disclosure.

Referring to FIG. 5A, the display panel 100 may include a plurality of scan lines SL1, SL2 to SLn-1, SLn, a plurality of data lines DL1, DL2 to DLm, and a plurality of pixels PX, where n and m are positive integers. Each of the pixels PX may be connected to a corresponding data line among the data lines DL1, DL2 to DLm and a corresponding scan line among the scan lines SL1, SL2 to SLn-1, SLn. According to embodiments of the present disclosure, the display panel 100 may further include light emission control lines, and the panel driver 100C may further include a light emission driving circuit that provides control signals to the light emission control lines. However, the configuration of the display panel 100 is not limited thereto.

Each of the scan lines SL1, SL2 to SLn may extend in the first direction DR1, and the scan lines SL1, SL2 to SLn may be arranged spaced apart from each other in the second direction DR2. Each of the data lines DL1, DL2 to DLm may extend in the second direction DR2, and the data lines DL1, DL2 to DLm may be arranged spaced apart from each other in the first direction DR1.

The panel driver 100C may include a signal control circuit 100C1, a scan driving circuit 100C2, and a data driving circuit 100C3.

The signal control circuit 100C1 may receive the image data RGB and the display control signal D-CS from the main controller 1000C (refer to FIG. 2). The display control signal D-CS may include a variety of signals. As an example, the display control signal D-CS may include a vertical synchronization signal, a horizontal synchronization signal, a main clock, a data enable signal, and the like.

The signal control circuit 100C1 may generate a scan control signal CONT1 in response to the display control signal D-CS and may output the scan control signal CONT1 to the scan driving circuit 100C2. The scan control signal CONT1 may include, for example, a vertical start signal, a clock signal, and the like. The signal control circuit 100C1 may generate a data control signal CONT2 in response to the display control signal D-CS and may output the data control signal CONT2 to the data driving circuit 100C3. The data control signal CONT2 may include, for example, a horizontal start signal, an output enable signal, and the like.

In addition, the signal control circuit 100C1 may process the image data RGB to meet operating conditions of the display panel 100 and may output a data signal DS to the data driving circuit 100C3. The scan control signal CONT1 and the data control signal CONT2 are utilized for the operations of the scan driving circuit 100C2 and the data driving circuit 100C3.

The scan driving circuit 100C2 may drive the scan lines SL1, SL2 to SLn in response to the scan control signal CONT1. According to an embodiment, the scan driving circuit 100C2 may be formed through the same process as the circuit layer 120 (refer to FIG. 4) of the display panel 100. However, embodiments of the present disclosure are not limited thereto. The scan driving circuit 100C2 may be directly mounted in a predetermined area of the display panel 100 after being implemented as an integrated circuit (IC) or may be electrically connected to the display panel 100 after being mounted on a separate printed circuit board in a chip-on-film (COF) manner.

The data driving circuit 100C3 may output grayscale voltages to the data lines DL1, DL2 to DLm in response to the data control signal CONT2 and the data signal DS received from the signal control circuit 100C1. The data driving circuit 100C3 may be directly mounted in a predetermined area of the display panel 100 after being implemented as an integrated circuit (IC) or may be electrically connected to the display panel 100 after being mounted on a separate printed circuit board in a chip-on-film (COF) manner. However, embodiments of the present disclosure are not limited thereto. For example, according to embodiments, the data driving circuit 100C3 may be formed through the same process as the circuit layer 120 (refer to FIG. 4) of the display panel 100.

FIG. 5B is a circuit diagram of a pixel PXij among the pixels PX shown in FIG. 5A as a representative example. The pixels PX may have the same circuit configuration, and thus, the circuit configuration of the pixel PXij will be described in detail, and details of other pixels will be omitted.

The pixel PXij may be connected to an i-th data line DLi (hereinafter, referred to as a data line) among the data lines DL1, DL2 to DLm, where i and j are positive integers. The pixel PXij may be connected to a j-th initialization scan line SILj (hereinafter, referred to as an initialization scan line), a j-th write scan line SWLj (hereinafter, referred to as a first write scan line), and a (j+1)th write scan line SWLj+1 (hereinafter, referred to as a second write scan line) among the scan lines SL1 to SLn (refer to FIG. 5A). In addition, the pixel PXij may be connected to a j-th compensation scan line SCLj (hereinafter, referred to as a compensation scan line) among the scan lines SL1, SL2 to SLn-1, SLn. Alternatively, the pixel PXij may be connected to a separate j-th black scan line instead of the second write scan line SWLj+1. The pixel PXij may be connected to a j-th light emission control line EMLj (hereinafter, referred to as a light emission control line) among the light emission control lines EML1 to EMLn.

The pixel PXij may include the light emitting element ED and a pixel circuit part PXC. The light emitting element ED may include a light emitting diode. The light emitting diode may include, for example, an organic light emitting material, an inorganic light emitting material, a quantum dot, or a quantum rod as its light emitting layer.

The pixel circuit part PXC may include first, second, third, fourth, fifth, sixth, and seventh transistors T1, T2, T3, T4, T5, T6, and T7 and one capacitor Cst. Each of the first to seventh transistors T1 to T7 may be a transistor including a low-temperature polycrystalline silicon (LTPS) semiconductor layer. Some transistors of the first to seventh transistors T1 to T7 may be a P-type transistor, and the other transistors may be an N-type transistor. As an example, each of the first, second, fifth, sixth, and seventh transistors T1, T2, T5, T6, and T7 among the first to seventh transistors T1 to T7 may be the P-type transistor, and each of the third and fourth transistors T3 and T4 may be the N-type transistor including an oxide semiconductor as its semiconductor layer. However, the configuration of the pixel circuit part PXC is not limited to the configuration shown in FIG. 5B. The pixel circuit part PXC shown in FIG. 5B is merely an example, and the configuration of the pixel circuit part PXC may be changed. As an example, all the first to seventh transistors T1 to T7 may be the P-type transistor or the N-type transistor.

The initialization scan line SILj, the compensation scan line SCLj, the first and second write scan lines SWLj and SWLj+1, and the light emission control line EMLj may transmit a j-th initialization scan signal SIj (hereinafter, referred to as an initialization scan signal), a j-th compensation scan signal SCj (hereinafter, referred to as a compensation scan signal), j-th and (j+1)th write scan signals SWj and SWj+1 (hereinafter, referred to as first and second write scan signals), and a j-th light emission control signal EMj (hereinafter, referred to as a light emission control signal) to the pixel PXij, respectively. The data line DLi may transmit a data signal Di to the pixel PXij. The data signal Di may have a voltage level corresponding to a grayscale of a corresponding input image signal among the input image signal RGB input to the display device 1000 (refer to FIG. 1). First, second, third, and fourth driving voltage lines VL1, VL2, VL3, and VL4 may transmit a first driving voltage ELVDD, a second driving voltage ELVSS, a first initialization voltage VINT, and a second initialization voltage AINT to the pixel PXij, respectively.

The first transistor T1 may include a first electrode connected to the first driving voltage line VL1 via the fifth transistor T5, a second electrode electrically connected to an anode of the light emitting element ED via the sixth transistor T6, and a gate electrode connected to one end of the capacitor Cst. The first transistor T1 may receive the data signal Di transmitted via the data line DLi according to a switching operation of the second transistor T2 and may supply a driving current Id to the light emitting element ED.

The second transistor T2 may include a first electrode connected to the data line DLi, a second electrode connected to the first electrode of the first transistor T1, and a gate electrode connected to the first write scan line SWLj. The second transistor T2 may be turned on in response to the first write scan signal SWj applied thereto via the first write scan line SWLj and may transmit the data signal Di applied thereto via the data line DLi to the first electrode of the first transistor T1.

The third transistor T3 may include a first electrode connected to the second electrode of the first transistor T1, a second electrode connected to the gate electrode of the first transistor T1, and a gate electrode connected to the compensation scan line SCLj. The third transistor T3 may be turned on in response to the compensation scan signal SCj applied thereto via the compensation scan line SCLj and may connect the gate electrode and the second electrode of the first transistor T1 to each other to allow the first transistor T1 to be connected in a diode configuration.

The fourth transistor T4 may include a first electrode connected to the gate electrode of the first transistor T1, a second electrode connected to the third driving voltage line VL3 to which the first initialization voltage VINT is transmitted, and a gate electrode connected to the initialization scan line SILj. The fourth transistor T4 may be turned on in response to the initialization scan signal SIj applied thereto via the initialization scan line SILj and may transmit the first initialization voltage VINT to the gate electrode of the first transistor T1 to perform an initialization operation that initializes a voltage of the gate electrode of the first transistor T1.

The fifth transistor T5 may include a first electrode connected to the first driving voltage line VL1, a second electrode connected to the first electrode of the first transistor T1, and a gate electrode connected to the light emission control line EMLj.

The sixth transistor T6 may include a first electrode connected to the second electrode of the first transistor T1, a second electrode connected to the anode of the light emitting element ED, and a gate electrode connected to the light emission control line EMLj.

The fifth transistor T5 and the sixth transistor T6 may be substantially simultaneously turned on in response to the light emission control signal EMj applied thereto via the light emission control line EMLj. The first driving voltage ELVDD applied via the turned-on fifth transistor T5 may be compensated for by the first transistor T1 connected in the diode configuration and may be transmitted to the light emitting element ED.

The seventh transistor T7 may include a first electrode connected to the second electrode of the sixth transistor T6, a second electrode connected to the fourth driving voltage line VL4 to which the second initialization voltage AINT is transmitted, and a gate electrode connected to the second write scan line SWLj+1.

As described above, the one end of the capacitor Cst may be connected to the gate electrode of the first transistor T1, and the other end of the capacitor Cst may be connected to the first driving voltage line VL1. A cathode of the light emitting element ED may be connected to the second driving voltage line VL2 that transmits the second driving voltage ELVSS.

Referring to FIGS. 5B and 5C, the display panel 100 (refer to FIG. 5A) may display the image during a plurality of frames F1. When the initialization scan signal SIj having a high level is provided via the initialization scan line SILj during an initialization period PPI of the frame F1, the fourth transistor T4 may be turned on in response to the initialization scan signal SIj having the high level. The first initialization voltage VINT may be transmitted to the gate electrode of the first transistor T1 via the turned-on fourth transistor T4, and the gate electrode of the first transistor T1 may be initialized by the first initialization voltage VINT.

Then, when the compensation scan signal SCj having a high level is provided via the compensation scan line SCLj during a compensation period PP2 of the frame F1, the third transistor T3 may be turned on. According to embodiments, the compensation period PP2 does not overlap the initialization period PP1. During the compensation period PP2, the first transistor T1 may be connected in a diode configuration by the turned-on third transistor T3 and may be biased in a forward direction.

As an example, an active period, e.g., the compensation period PP2, of the compensation scan signal SCj may be defined as a period in which the compensation scan signal SCj has the high level, and an active period, e.g., the initialization period PP1, of the initialization scan signal SIj may be defined as a period in which the initialization scan signal SIj has the high level. The active period of the initialization scan signal SIj may precede the active period of the compensation scan signal SCj. When each of the third and fourth transistors T3 and T4 is the P-type transistor, the active period, e.g., the compensation period PP2, of the compensation scan signal SCj may be defined as a period in which the compensation scan signal SCj has a low level, and the active period, e.g., the initialization period PP1, of the initialization scan signal SIj may be defined as a period in which the initialization scan signal SIj has a low level.

The compensation period PP2 may include a data write period PP3 in which the first write scan signal SWj is generated at a low level. The second transistor T2 may be turned on in response to the first write scan signal SWj at the low level during the data write period PP3. Then, a compensation voltage "Di-Vth" obtained by subtracting a threshold voltage Vth of the first transistor T1 from the data signal Di provided via the data line DLi may be applied to the gate electrode of the first transistor T1. That is, an electric potential of the gate electrode of the first transistor T1 may be the compensation voltage "Di-Vth".

The first driving voltage ELVDD and the compensation voltage "Di-Vth" may be respectively applied to both ends of the capacitor Cst, and the capacitor Cst may be charged with electric charges corresponding to a difference in voltage between the both ends of the capacitor Cst.

The seventh transistor T7 may be turned on in response to the second write scan signal SWj+1 having a low level applied thereto via the second write scan line SWLj+1 during an anode initialization period PP4. A portion of the driving current Id may be bypassed as a bypass current Ibp via the seventh transistor T7.

In a case in which the pixel PXij displays a black image, when the light emitting element ED emits a light even though a minimum driving current of the first transistor T1 flows as the driving current Id, the pixel PXij may not properly display the black image. Therefore, the seventh transistor T7 of the pixel PXij according to an embodiment of the present disclosure may distribute a portion of the minimum driving current of the first transistor T1 to another current path rather than to a current path to the light emitting element ED as the bypass current Ibp. In this case, the minimum driving current of the first transistor T1 means a current flowing to the first transistor T1 under a condition that a gate-source voltage Vgs of the first transistor T1 is less than the threshold voltage Vth and the first transistor T1 is turned off. In this way, when the minimum driving current that turns off the first transistor T1, for example, a current of less than about 10 pA, is transmitted to the light emitting element ED, an image with a black grayscale may be displayed. In a case in which the pixel PXij displays the black image, an influence of the bypass current Ibp on the minimum driving current is relatively large, however, in a case in which images, such as a normal image or a white image, are displayed, the influence of the bypass current Ibp on the driving current Id may be negligible. Accordingly, when the black image is displayed, a current, e.g., a light emitting current Ied, reduced by an amount of the bypass current Ibp, which is bypassed through the seventh transistor T7, from the driving current Id may be provided to the light emitting element ED, and thus, the black image may be clearly displayed. Thus, the pixel PXij may display an accurate black grayscale image using the seventh transistor T7, and as a result, a contrast ratio may be improved.

Then, a level of the light emission control signal EMj provided from the light emission control line EMLj may be changed to a low level from a high level. The fifth transistor T5 and the sixth transistor T6 may be turned on in response to the light emission control signal EMj having the low level. As a result, the driving current Id may be generated due to a difference in voltage between a gate voltage of the gate electrode of the first transistor T1 and the first driving voltage ELVDD, the driving current Id may be supplied to the light emitting element ED via the sixth transistor T6, and thus, the light emitting current Ied may flow through the light emitting element ED.

Figure 6A:
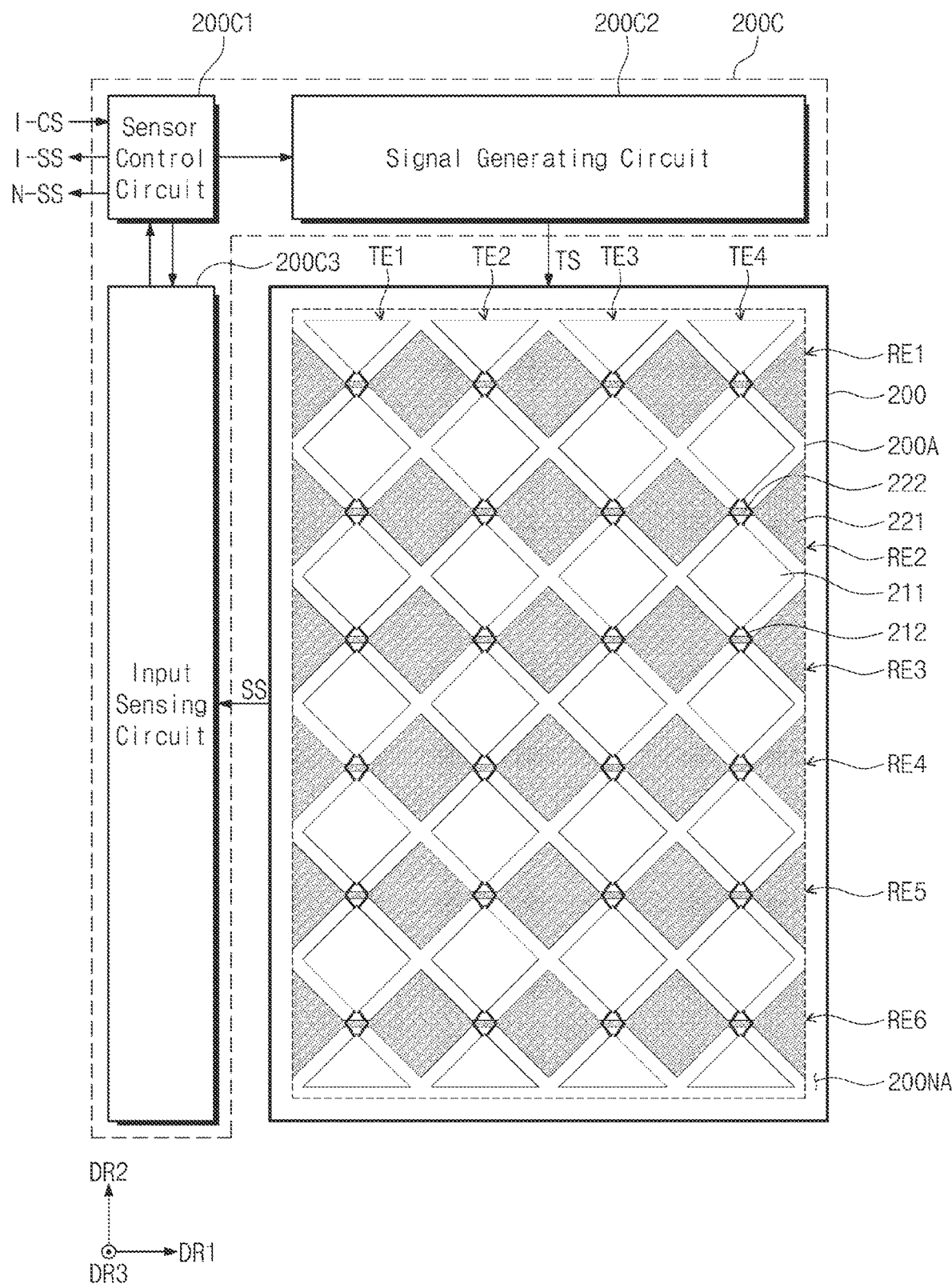
FIG. 6A is a block diagram of an input sensor and a sensor controller according to an embodiment of the present disclosure.
Figure 6B:
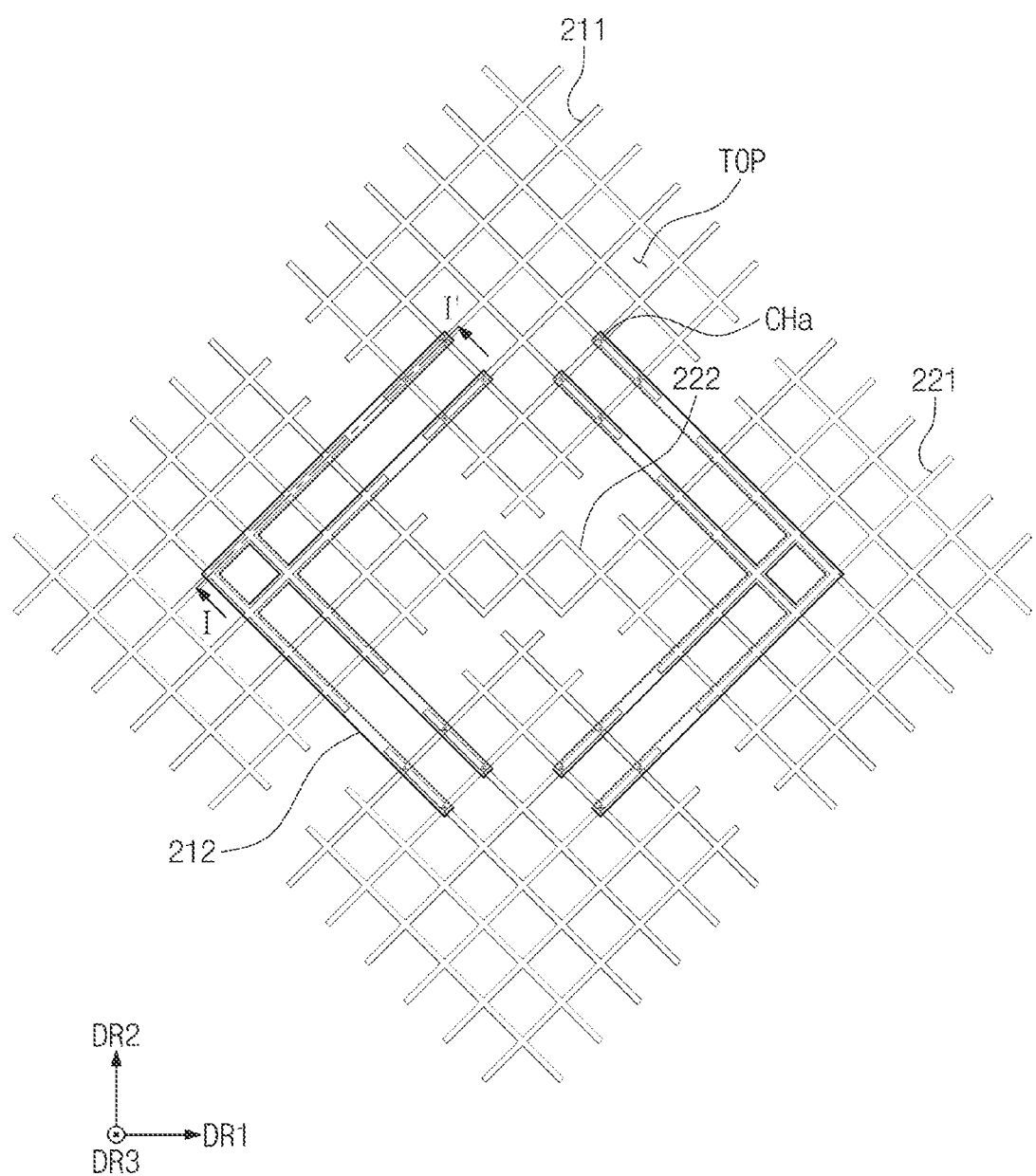
FIG. 6B is an enlarged plan view of a portion of the input sensor shown in FIG. 6A according to an embodiment of the present disclosure.
Figure 6C:
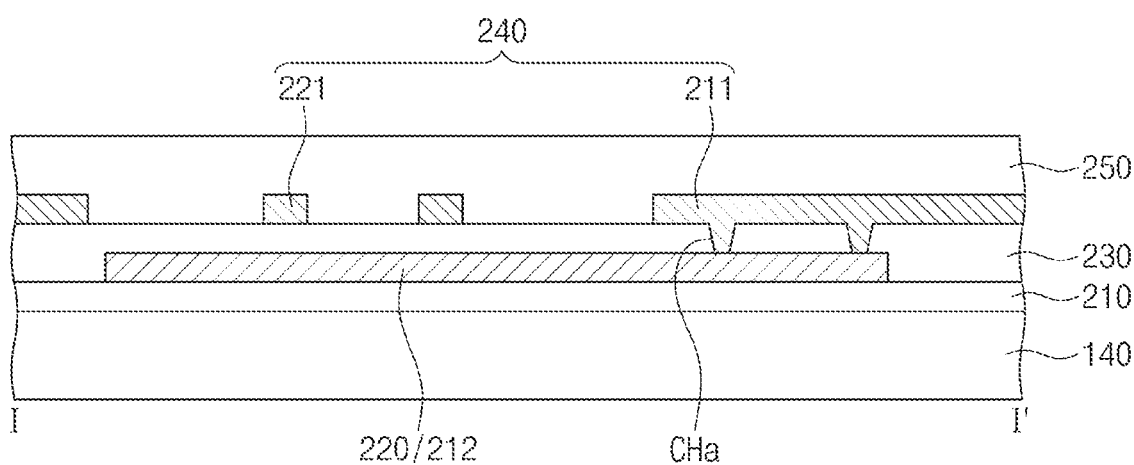
FIG. 6C is a cross-sectional view taken along a line I-I' shown in FIG. 6B according to an embodiment of the present disclosure.

FIG. 6A is a block diagram of the input sensor 200 and the sensor controller 200C according to an embodiment of the present disclosure. FIG. 6B is an enlarged plan view of a portion of the input sensor 200 shown in FIG. 6A according to an embodiment of the present disclosure. FIG. 6C is a cross-sectional view taken along a line I-I' shown in FIG. 6B according to an embodiment of the present disclosure.

Referring to FIGS. 6A to 6C, the input sensor 200 may include a plurality of transmission electrodes TE1, TE2, TE3 and TE4 (or first sensing electrodes) and a plurality of reception electrodes RE1, RE2, RE3, RE4, RE5 and RE6 (or second sensing electrodes). The transmission electrodes TE1 to TE4 may extend in the second direction DR2 and may be arranged in the first direction DR1. The reception electrodes RE1 to RE6 may extend in the first direction DR1 and may be arranged in the second direction DR2. The transmission electrodes TE1 to TE4 may cross the reception electrodes RE1 to RE6. A capacitance may be formed between the transmission electrodes TE1 to TE4 and the reception electrodes RE1 to RE6.

According to embodiments, the input sensor 200 may further include a plurality of first signal lines connected to the transmission electrodes TE1 to TE4 and a plurality of second signal lines connected to the reception electrodes RE1 to RE6.

The input sensor 200 may include a sensing area 200A and a non-sensing area 200NA. The sensing area 200A may correspond to the active area AA shown in FIG. 1, and the non-sensing area 200NA may correspond to the peripheral area NAA shown in FIG. 1. The sensing area 200A may be an area in which the transmission electrodes TE1 to TE4 and the reception electrodes RE1 to RE6 are arranged and the input is substantially sensed. The non-sensing area 200NA may be an area in which the first and second signal lines are arranged and the input is not sensed.

Each of the transmission electrodes TE1 to TE4 may include a first sensing portion 211 and a bridge portion 212. Two first sensing portions 211 adjacent to each other may be electrically connected to each other by the bridge portion 212. However, embodiments of the present disclosure are not limited thereto. The first sensing portion 211 and the bridge portion 212 may be disposed on different layers from each other. As an example, the first sensing portion 211 may be included in the second conductive layer 240, and the bridge portion 212 may be included in the first conductive layer 220. According to an embodiment, the first sensing portion 211 may be included in the first conductive layer 220, and the bridge portion 212 may be included in the second conductive layer 240.

Each of the reception electrodes RE1 to RE6 may include a second sensing portion 221 and a connection portion 222. The second sensing portion 221 and the connection portion 222 may be provided integrally with each other and may be disposed on the same layer. As an example, the second sensing portion 221 and the connection portion 222 may be included in the second conductive layer 240. According to an embodiment, the second sensing portion 221 and the connection portion 222 may be included in the first conductive layer 220.

The bridge portion 212 may be insulated from the connection portion 222 while crossing the connection portion 222. In a case in which the first and second sensing portions 211 and 221 and the connection portion 222 are included in the second conductive layer 240, the bridge portion 212 may be included in the first conductive layer 220. Alternatively, in a case in which the first and second sensing portions 211 and 221 and the connection portion 222 are included in the first conductive layer 220, the bridge portion 212 may be included in the second conductive layer 240.

The sensing insulating layer 230 may be disposed between the first sensing portion 211 and the bridge portion 212, and the first sensing portion 211 may be electrically connected to the bridge portion 212 via a contact hole CHa defined through the sensing insulating layer 230.

Each of the transmission electrodes TE1 to TE4 may have a mesh shape, and each of the reception electrodes RE1 to RE6 may have a mesh shape.

The first and second sensing portions 211 and 221, the bridge portion 212, and the connection portion 222 may include a metal layer. Each of the first and second sensing portions 211 and 221, the bridge portion 212, and the connection portion 222 may have a mesh shape. Accordingly, each of the first and second sensing portions 211 and 221 may be provided with touch openings TOP defined therethrough by mesh lines. As an example, each of the touch openings TOP may have a lozenge shape.

When viewed in the plane, the light emitting elements ED (refer to FIG. 4) may be respectively disposed in the touch openings TOP. Accordingly, a light emitted from each light emitting element ED may be normally emitted without being influenced by the first and second sensing portions 211 and 221.

As shown in FIG. 6A, the sensor controller 200C may receive the sensing control signal I-CS from the main controller 1000C (refer to FIG. 2) and may provide the coordinate signal I-SS or the proximity sensing signal N-SS to the main controller 1000C.

The sensor controller 200C may be directly mounted on the input sensor 200 after being implemented as an integrated circuit (IC) or may be electrically connected to the input sensor 200 after being mounted on a separate printed circuit board in a chip-on-film (COF) manner.

The sensor controller 200C may include a sensor control circuit 200C1, a signal generating circuit 200C2, and an input sensing circuit 200C3. The sensor control circuit 200C1 may control an operation of the signal generating circuit 200C2 and the input sensing circuit 200C3 in response to the sensing control signal I-CS.

The signal generating circuit 200C2 may output transmission signals TS to the input sensor 200, for example, the transmission electrodes TE1 to TE4. The input sensing circuit 200C3 may receive sensing signals SS from the reception electrodes RE1 to RE6 of the input sensor 200. The input sensing circuit 200C3 may convert an analog signal to a digital signal. As an example, the input sensing circuit 200C3 may amplify and filter the received analog-type sensing signals SS and may convert the filtered signal into the digital signal.

The sensor control circuit 200C1 may generate the coordinate signal I-SS or the proximity sensing signal N-SS based on the digital signal provided from the input sensing circuit 200C3. For example, the sensor control circuit 200C1 may generate the coordinate signal I-SS using the digital signal in an input sensing mode (or a first sensing mode) in which the external input 2000 (refer to FIG. 2), for example, a touch input, is generated by the user's finger. In addition, the sensor control circuit 200C1 may generate the proximity sensing signal N-SS using the digital signal in a proximity sensing mode (or a second sensing mode) in which the approach of the object 3000 (refer to FIG. 2) is sensed.

Figure 7:
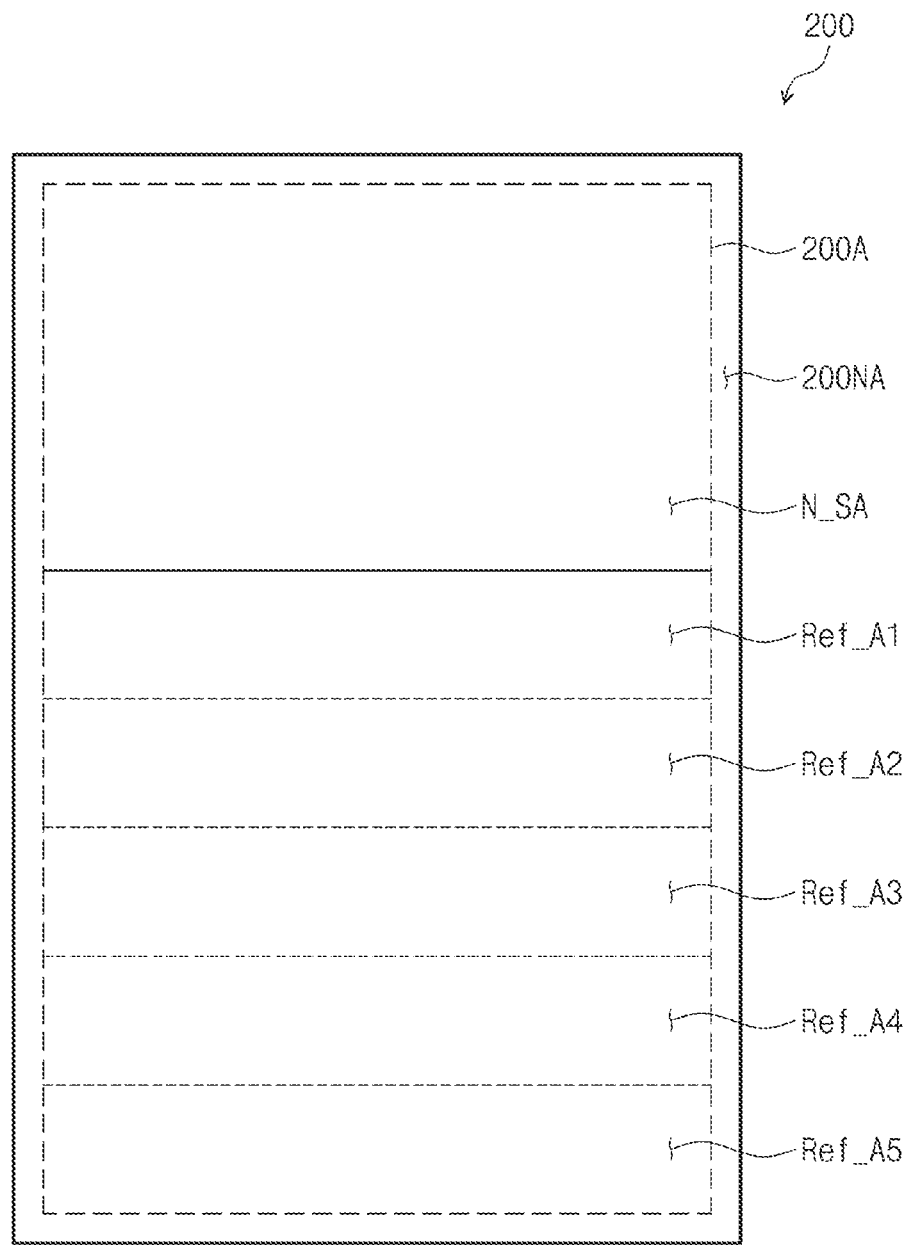
FIG. 7 is a plan view of a proximity sensing area and reference areas of an input sensor according to an embodiment of the present disclosure.

FIG. 7 is a plan view of a proximity sensing area N_SA and reference areas Ref_A1, Ref_A2, Ref_A3, Ref_A4 and Ref_A5 of the input sensor 200 according to an embodiment of the present disclosure.

Referring to FIG. 7, the sensing area 200A of the input sensor 200 may be divided into the proximity sensing area N_SA and the reference areas Ref_A1 to Ref_A5 in the proximity sensing mode. As an example, the proximity sensing area N_SA may be disposed at an upper side of the sensing area 200A. However, embodiments of the present disclosure are not limited thereto. According to an embodiment, the proximity sensing area N_SA may be disposed at a lower side of the sensing area 200A or may be disposed at a center of the sensing area 200A.

As an example, the reference areas Ref_A1 to Ref_A5 may include five reference areas (hereinafter, referred to as first to fifth reference areas Ref_A1 to Ref_A5). However, the number of the reference areas is not limited thereto. The first reference area Ref_A1 may be placed closest to the proximity sensing area N_SA, and the fifth reference area Ref_A5 may be placed farthest from the proximity sensing area N_SA. FIG. 7 shows a structure in which the first to fifth reference areas Ref_A1 to Ref_A5 have substantially the same size as each other. However, embodiments of the present disclosure are not limited thereto. For example, according to embodiments, the first to fifth reference areas Ref_A1 to Ref_A5 may have different sizes from each other. As an example, the size of the first to fifth reference areas Ref_A1 to Ref_A5 may decrease as a distance from the proximity sensing area N_SA increases.

FIG. 7 shows a structure in which the size of each of the first to fifth reference areas Ref_A1 to Ref_A5 is smaller than a size of the proximity sensing area N_SA as a representative example. However, embodiments of the present disclosure are not limited thereto. For example, according to embodiments, the size of each of the first to fifth reference areas Ref_A1 to Ref_A5 may be equal to or greater than the size of the proximity sensing area N_SA.

As an example, in a case in which the sensor controller 200C (refer to FIG. 6A) receives the sensing signals SS (refer to FIG. 6A) from the reception electrodes RE1 to RE6 (refer to FIG. 6A) of the input sensor 200, the sensing area 200A may include the reference areas Ref_A1 to Ref_A5 arranged in the direction in which the reception electrodes RE1 to RE6 are arranged, e.g., the second direction. In a case in which the first to fifth reference areas Ref_A1 to Ref_A5 have the same size, the number of the reception electrodes arranged in each of the reference areas Ref_A1 to Ref_A5 may be the same. The number of the reception electrodes arranged in the proximity sensing area N_SA may be different from the number of the reception electrodes arranged in each of the reference areas Ref_A1 to Ref_A5.

Figure 8A:
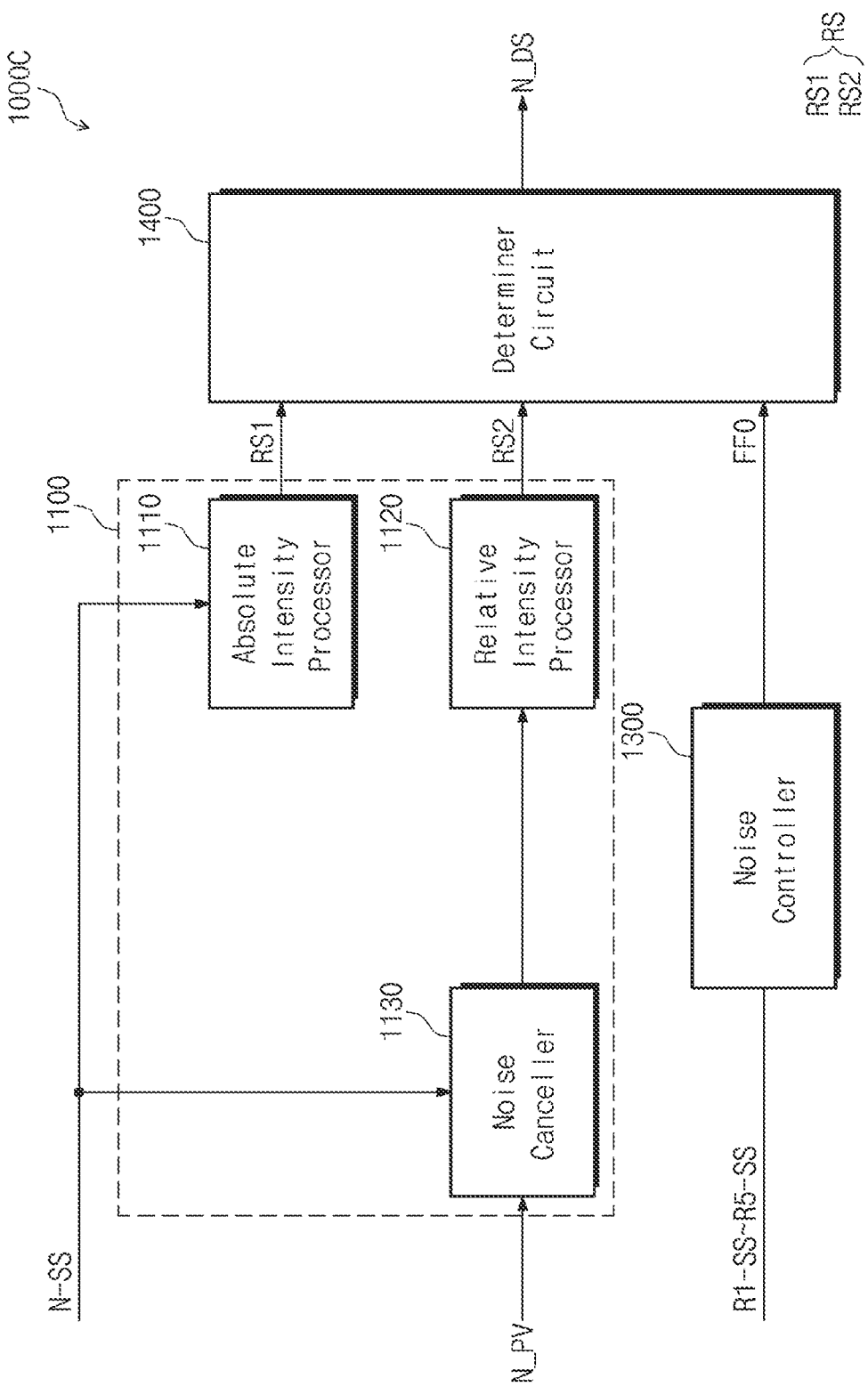
FIG. 8A is a block diagram of a main controller according to an embodiment of the present disclosure.
Figure 8B:
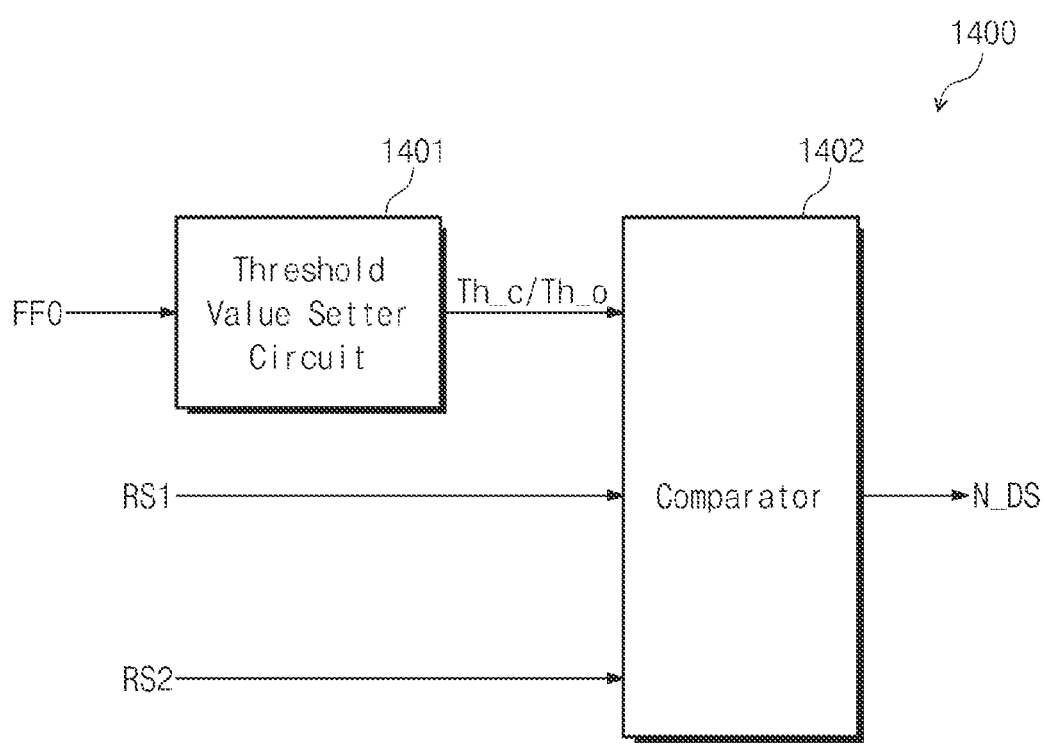
FIG. 8B is a block diagram of a determiner circuit shown in FIG. 8A according to an embodiment of the present disclosure.

FIG. 8A is a block diagram of the main controller 1000C according to an embodiment of the present disclosure. FIG. 8B is a block diagram of a determiner circuit 1400 shown in FIG. 8A according to an embodiment of the present disclosure.

Referring to FIGS. 7 and 8A, the sensor controller 200C may convert the sensing signals output from the reception electrodes arranged in the proximity sensing area N_SA to the proximity sensing signal N-SS, and may convert the sensing signals output from the reception electrodes arranged in the first to fifth reference areas Ref_A1 to Ref_A5 to first to fifth reference sensing signals R1-SS to R5-SS, respectively, in the proximity sensing mode.

In an ideal situation where a noise does not occur, the first to fifth reference sensing signals R1-SS to R5-SS may have the same level as each other. However, when the noise occurs, the levels of the first to fifth reference sensing signals R1-SS to R5-SS may be different from each other. As an example, the main controller 1000C may compare the levels of the first to fifth reference sensing signals R1-SS to R5-SS with each other to determine whether the noise occurs, e.g., whether the noise is present, and/or to determine a level of the noise.

As an example, the main controller 1000C may include a processor 1100, a noise controller 1300 (also referred to as a noise controller circuit), and the determiner circuit 1400. The processor 1100 may receive the proximity sensing signal N-SS from the sensor controller 200C and may process the proximity sensing signal N-SS to output a result signal RS. As an example, the processor 1100 may include an absolute intensity processor 1110, a relative intensity processor 1120, and a noise canceller 1130. The absolute intensity processor 1110 may receive the proximity sensing signal N-SS from the sensor controller 200C. The absolute intensity processor 1110 may calculate the proximity sensing signal N-SS, e.g., raw data, as it is. The absolute intensity processor 1110 may determine whether the object 3000 (refer to FIG. 2) is in proximity based on the proximity sensing signal N-SS and may output a signal about the determined result, e.g., a first result signal RS1, to the determiner circuit 1400.

The noise canceller 1130 may differentiate a noise prediction value N_PV from the proximity sensing signal N-SS, and thus may remove noise from the proximity sensing signal N-SS by. The noise prediction value N_PV may be a value predicted using a noise prediction model. The noise canceller 1130 may provide a signal obtained by differentiating the noise prediction value N_PV from the proximity sensing signal N-SS to the relative intensity processor 1120. The relative intensity processor 1120 may determine whether the object is in proximity based on a sensing signal obtained by removing the noise prediction value N_PV from the proximity sensing signal N-SS and may output a signal about the determined result, e.g., a second result signal RS2, to the determiner circuit 1400.

The noise controller 1300 may receive the first to fifth reference sensing signals R1-SS to R5-SS from the sensor controller 200C and may process the first to fifth reference sensing signals R1-SS to R5-SS to output a noise control signal FF0. The noise controller 1300 may compare the first to fifth reference sensing signals R1-SS to R5-SS with each other to determine whether the noise is present. As an example, the noise controller 1300 may compare the first reference sensing signal R1-SS with the second to fifth reference sensing signals R2-SS to R5-SS to determine whether the noise is present. In a case in which the first reference sensing signal R1-SS is different from at least one of the second to fifth reference sensing signals R2-SS to R5-SS, the noise controller 1300 may determine that the noise occurs, and in a case in which the first reference sensing signal R1-SS is the same as the second to fifth reference sensing signals R2-SS to R5-SS, the noise controller 1300 may determine that the noise does not occur. The noise control signal FF0 may have a value that varies depending on the presence or absence of the noise.

Referring to FIGS. 8A and 8B, the determiner circuit 1400 may finally determine whether the object is in proximity based on the first result signal RS1 and the second result signal RS2 and may output a proximity determination signal N_DS. The determiner circuit 1400 may compare the first result signal RS1 and the second result signal RS2 with a predetermined initial threshold value Th_o to determine whether the object is in proximity. The determiner circuit 1400 may receive the noise control signal FF0 from the noise controller 1300 and may control the initial threshold value Th_o based on the noise control signal FF0.

As an example, the determiner circuit 1400 may include a threshold value setter circuit 1401 and a comparator 1402 (also referred to as a comparator circuit). The threshold value setter circuit 1401 may control the initial threshold value Th_o based on the noise control signal FF0. That is, when the noise control signal FF0 is in an on-state (e.g., when the noise is present or a noise-on state), the threshold value setter circuit 1401 may adjust the initial threshold value Th_o to a change threshold value Th_c and may provide the change threshold value Th_c to the comparator 1402. The comparator 1402 may compare the change threshold value Th_c with the first and second result signals RS1 and RS2 and may determine whether the object is in proximity. As an example, the change threshold value Th_c may be greater than the initial threshold value Th_o. Accordingly, even though the first and second result signals RS1 and RS2 are distorted due to the noise, since the threshold value is controlled according to the presence or absence of the noise, the determiner circuit 1400 may accurately determine whether the object is in proximity in the noise-on state.

On the contrary, when the noise control signal FF0 is in an off-state (e.g., the noise is not present or a noise-off state), the threshold value setter circuit 1401 may provide the initial threshold value Th_o to the comparator 1402 without adjusting the initial threshold value Th_o. The comparator 1402 may compare the initial threshold value Th_o with the first and second result signals RS1 and RS2 and may determine whether the object is in proximity.

As described above, as the threshold value is controlled depending on whether the noise occurs, the determiner circuit 1400 may accurately determine whether the object 3000 is in proximity regardless of the presence or absence of the noise, and as a result, reliability about the proximity sensing ability of the display device 1000 (refer to FIG. 2) may be improved.

Figure 9A:
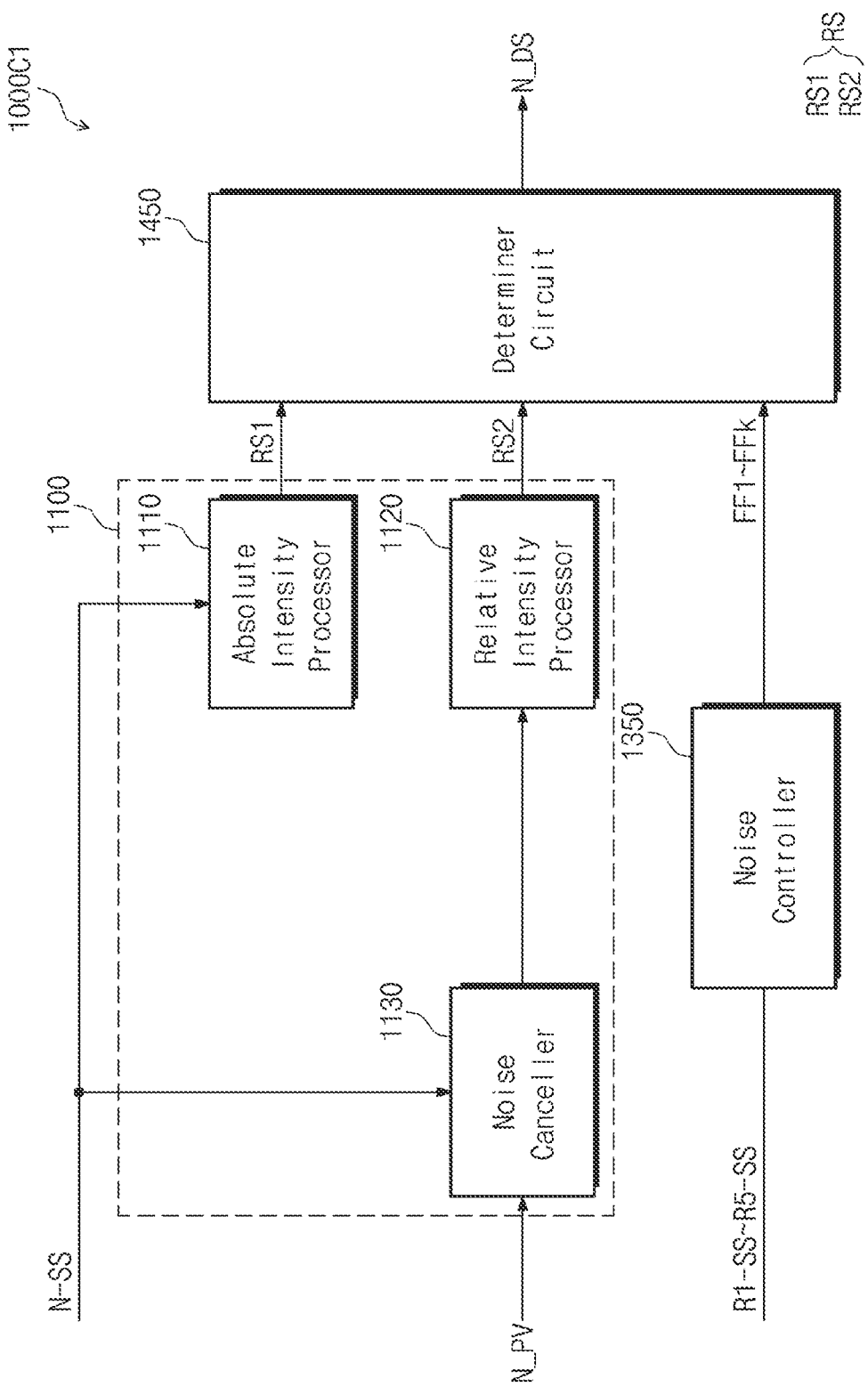
FIG. 9A is a block diagram of a main controller according to an embodiment of the present disclosure.
Figure 9B:
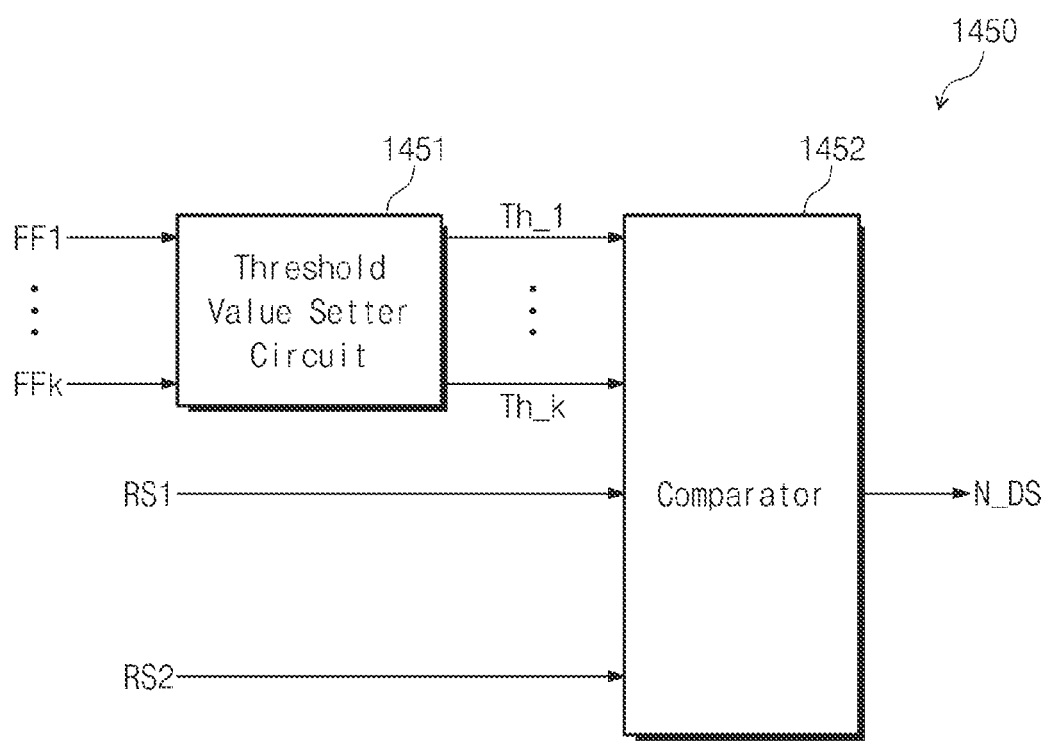
FIG. 9B is a block diagram of a determiner circuit shown in FIG. 9A according to an embodiment of the present disclosure.

FIG. 9A is a block diagram of a main controller 1000C1 according to an embodiment of the present disclosure. FIG. 9B is a block diagram of a determiner circuit 1450 shown in FIG. 9A according to an embodiment of the present disclosure. In FIG. 9A, the same reference numerals denote the same elements in FIG. 8A, and thus, for convenience of explanation, detailed descriptions of the same elements will be omitted.

Referring to FIGS. 9A and 9B, the main controller 1000C1 may include a processor 1100, a noise controller 1350, and the determiner circuit 1450.

The noise controller 1350 may receive first to fifth reference sensing signals R1-SS to R5-SS from a sensor controller 200C (refer to FIG. 6A), may process the first to fifth reference sensing signals R1-SS to R5-SS, and may output one of first to k-th noise control signals FF1 to FFk. In an embodiment, k is an integer number equal to or greater than 2. The noise controller 1350 may process the first to fifth reference sensing signals R1-SS to R5-SS to determine whether the noise is present, and in a case in which the noise is present, the noise controller 1350 may output one of the first to k-th noise control signals FF1 to FFk according to a level of the noise. As an example, in a case in which the level of the noise is in the smallest range, the noise controller 1350 may output the first noise control signal FF1, and in a case in which the level of the noise is in the largest range, the noise controller 1350 may output the k-th noise control signal FFk.

The determiner circuit 1450 may finally determine whether the object is in proximity based on a first result signal RS1 and a second result signal RS2 and may output a proximity determination signal N_DS. The determiner circuit 1450 may compare the first result signal RS1 and the second result signal RS2 with one of predetermined first to k-th threshold values Th_1 to Th_k to determine whether the object is in proximity.

As an example, the determiner circuit 1450 may include a threshold value setter circuit 1451 and a comparator 1452. The threshold value setter circuit 1451 may receive one of the first to k-th noise control signals FF1 to FFk from the noise controller 1350 and may select one threshold value corresponding to the received one noise control signal among the first to k-th threshold values Th_1 to Th_k. As an example, when the first noise control signal FF1 is received, the threshold value setter circuit 1451 may select the first threshold value Th_1 among the first to k-th threshold values Th_1 to Th_k and may provide the first threshold value Th_1 to the comparator 1452. When the k-th noise control signal FFk is received, the threshold value setter circuit 1451 may select the k-th threshold value Th_k among the first to k-th threshold values Th_1 to Th_k and may provide the k-th threshold value Th_k to the comparator 1452. As an example, the first threshold value Th_1 may be the smallest value among the first to k-th threshold values Th_1 to Th_k, and the k-th threshold value Th_k may be the greatest value among the first to k-th threshold values Th_1 to Th_k.

The comparator 1452 may receive the selected one threshold value from the threshold value setter circuit 1451 and may compare the received threshold value with the first and second result signals RS1 and RS2 to determine whether the object is in proximity.

However, In a case in which the noise is not present, according to embodiments, the threshold value setter circuit 1451 does not receive the first to k-th noise control signals FF1 to FFk. In this case, the threshold value setter circuit 1451 may provide the initial threshold value Th_o (refer to FIG. 8A) to the comparator 1452. The comparator 1452 may compare the initial threshold value Th_o with the first and second result signals RS1 and RS2 to determine whether the object is in proximity.

As described above, as the threshold value is adjusted depending on the level of the noise, the determiner circuit 1450 may accurately determine whether the object 3000 (refer to FIG. 2) is in proximity regardless of the level of the noise, and as a result, the proximity sensing reliability of the display device 1000 (refer to FIG. 2) may be improved.

Figure 10B:
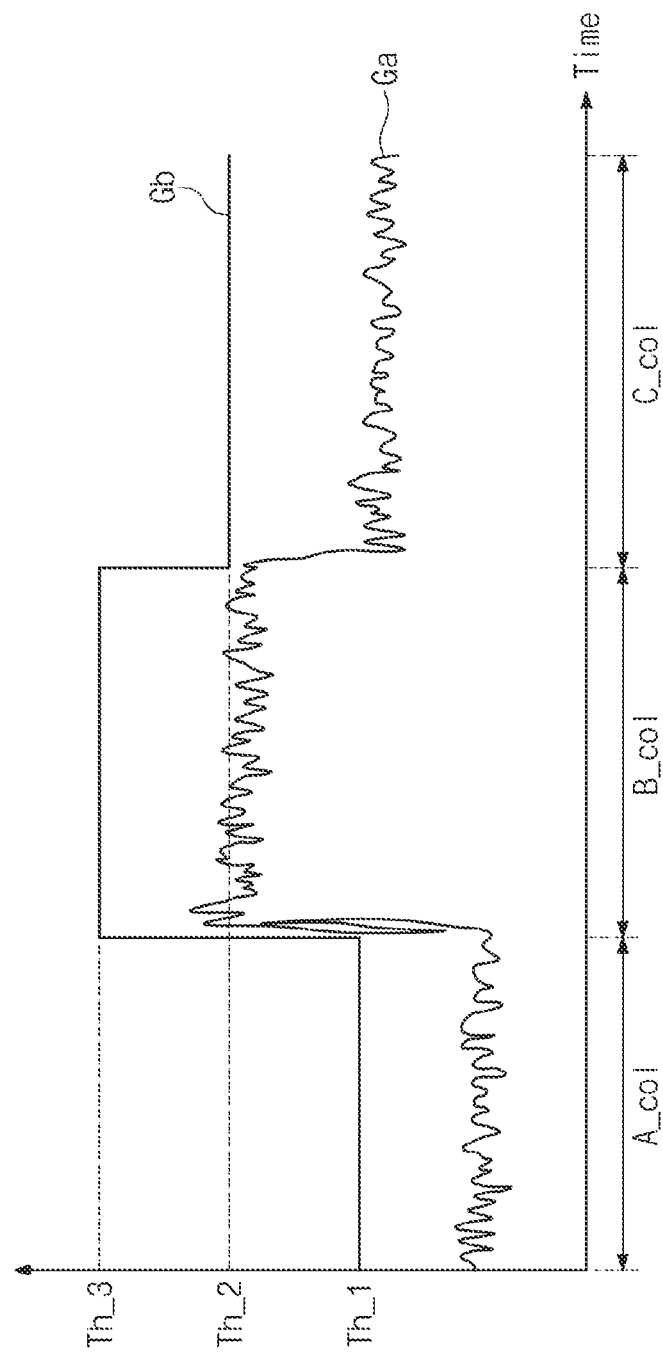

FIGS. 10A and 10B are waveform diagrams of variations of threshold values according to embodiments of the present disclosure. In FIGS. 10A and 10B, a first graph G1 or Ga shows the level of the noise that varies according to a time, and a second graph G2 or Gb shows a variation of the threshold value with a level that varies according to the level of the noise.

Referring to FIGS. 9B and 10A, In a case in which the level of the noise is small, for example, in a case in which the level of the noise is in a first noise range RA1, the threshold value setter circuit 1451 may select the first threshold value Th_1 among the first to k-th threshold values Th_1 to Th_k and may provide the first threshold value Th_1 to the comparator 1452. Then, in a case in which the noise increases at a first time point t1 and the level of the noise is in a second noise range RA2, the threshold value setter circuit 1451 may select the third threshold value Th_3 among the first to k-th threshold values Th_1 to Th_k and may provide the third threshold value Th_3 to the comparator 1452. The third threshold value Th_3 may be greater than the first threshold value Th_1. That is, when the level of the noise increases, whether the object 3000 (refer to FIG. 2) is in proximity may be determined by increasing the threshold value.

Then, in a case in which the noise decreases at a second time point t2 and the level of the noise is in a third noise range RA3, the threshold value setter circuit 1451 may the select the second threshold value Th_2 among the first to k-th threshold values Th_1 to Th_k and may provide the second threshold value Th_2 to the comparator 1452. In this case, the second threshold value Th_2 may be smaller than the third threshold value Th_3 and may be greater than the first threshold value Th_1. When the level of the noise decreases, whether the object is in proximity may be determined by decreasing the threshold value.

As described above, since the threshold value is adjusted depending on the level of the noise, the determiner circuit 1450 may accurately determine whether the object is in proximity regardless of the level of the noise, and as a result, the proximity sensing reliability of the display device 1000 may be improved.

Referring to FIGS. 9B and 10B, the level of the noise may vary depending on the image displayed through the display panel 100 (refer to FIG. 2). For example, the level of the noise may vary depending on a color of the image displayed through the display panel 100. The noise may have a first level in a first period A_col in which the image has a first color, and the noise may have a second level in a second period B_col in which the image has a second color. As an example, the second level may be greater than the first level. The noise may have a third level in a third period C_col in which the image has a third color. As an example, the third level may be greater than the first level and smaller than the second level.

The threshold value setter circuit 1451 may select the first threshold value Th_1 among the first to k-th threshold values Th_1 to Th_k and may provide the first threshold value Th_1 to the comparator 1452 in the first period A_col. The threshold value setter circuit 1451 may select the third threshold value Th_3 among the first to k-th threshold values Th_1 to Th_k and may provide the third threshold value Th_3 to the comparator 1452 in the second period B_col. The third threshold value Th_3 may be greater than the first threshold value Th_1. The threshold value setter circuit 1451 may select the second threshold value Th_2 among the first to k-th threshold values Th_1 to Th_k and may provide the second threshold value Th_2 to the comparator 1452 in the third period C_col. In an embodiment, the second threshold value Th_2 may be smaller than the third threshold value Th_3 and greater than the first threshold value Th_1.

In the second period B_col where the noise level is large, the proximity of the object may be determined under conservative conditions by increasing the threshold value, and in the first and third periods A_col and C_col where the noise level is small, the proximity of the object may be determined under sensitive conditions by decreasing the threshold value. Accordingly, the determiner circuit 1450 may accurately determine whether the object is in proximity regardless of the level of the noise, and as a result, the proximity sensing reliability of the display device 1000 may be improved.

Figure 11:
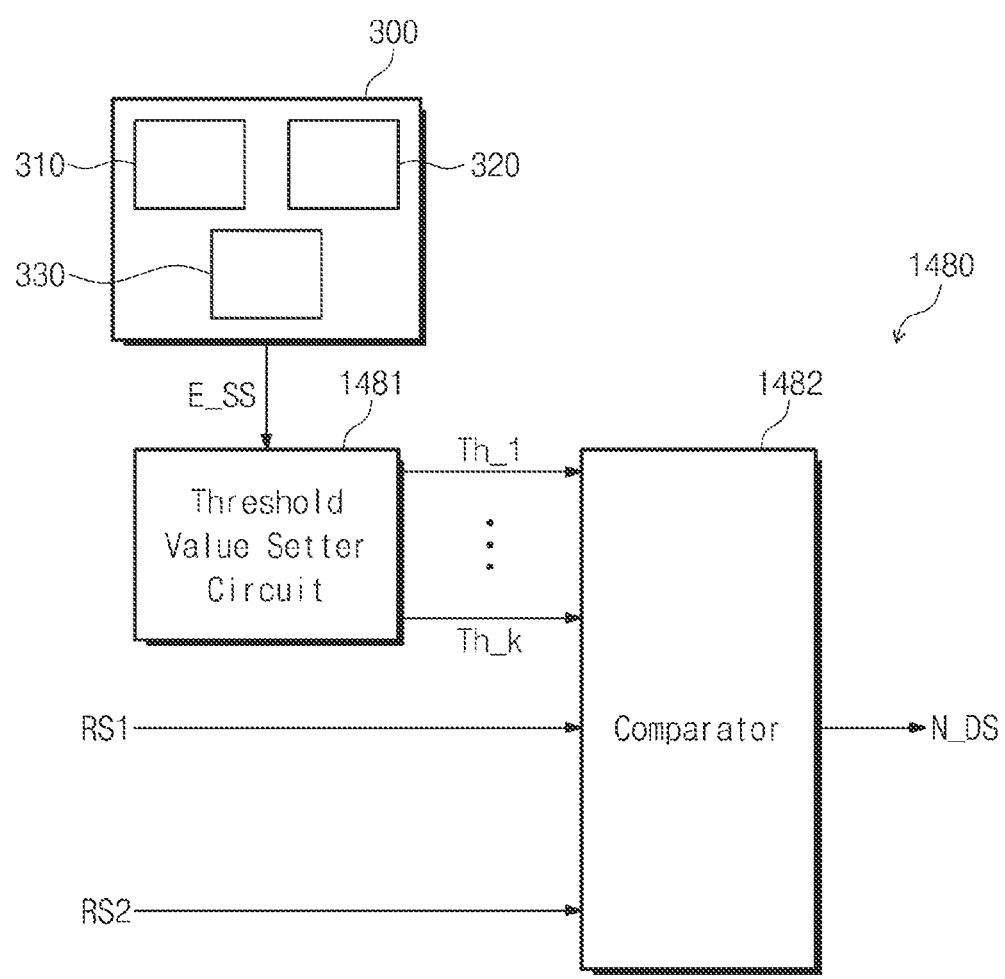
FIG. 11 is a block diagram of a determiner circuit according to an embodiment of the present disclosure.
Figure 12A:
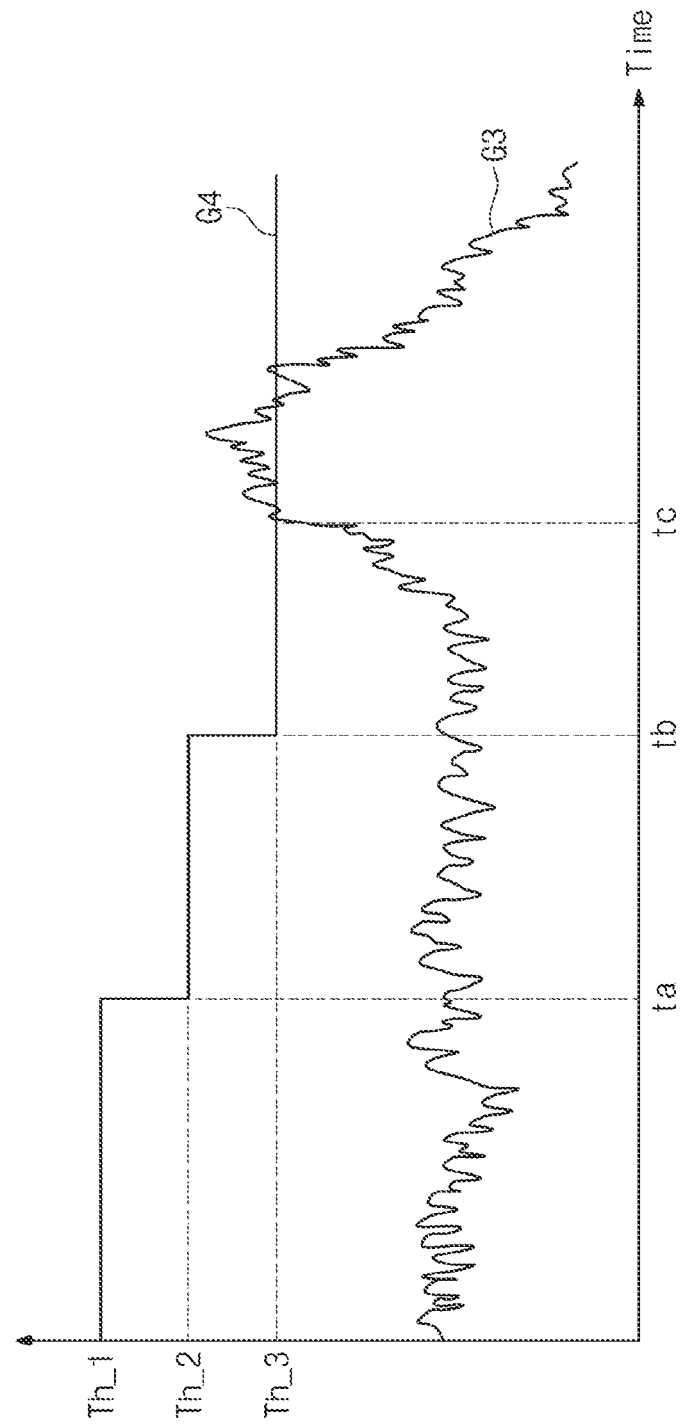
FIGS. 12A and 12B are waveform diagrams of variations of threshold values according to embodiments of the present disclosure.
Figure 12B:
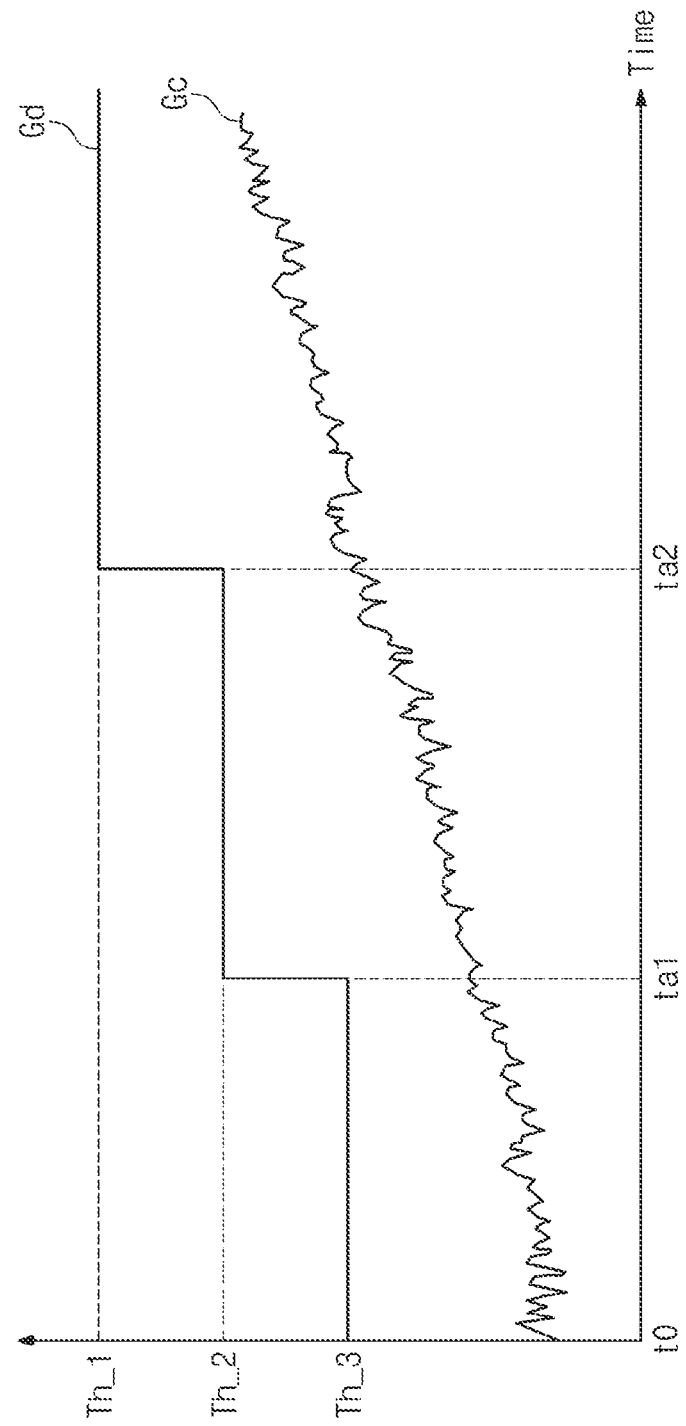

FIG. 11 is a block diagram of a determiner circuit 1480 according to an embodiment of the present disclosure. FIGS. 12A and 12B are waveform diagrams of variations of threshold values according to embodiments of the present disclosure. In FIGS. 12A and 12B, a third graph G3 or Gc shows a level of a proximity sensing signal that varies according to a time, and a fourth graph G4 or Gd shows a variation of the threshold value according to the time.

Referring to FIG. 11, the determiner circuit 1480 may be connected to a sensor module 300 (also referred to as a sensor circuit) included in the display device 1000 (refer to FIG. 1) and may receive an external sensing signal E_SS sensed by the sensor module 300. As an example, the sensor module 300 may include a grip sensor 310, a gyro sensor 320, and a temperature sensor 330. The sensor module 300 may further include an acceleration sensor and an ultraviolet ray sensor.

The determiner circuit 1480 may include a threshold value setter circuit 1481 and a comparator 1482. The threshold value setter circuit 1481 may be connected to the sensor module 300 and may receive the external sensing signal E_SS. The threshold value setter circuit 1481 may select one of first to k-th threshold values Th_1 to Th_k in response to the external sensing signal E_SS and may provide the selected threshold value to the comparator 1482. As an example, the external sensing signal E_SS may include a grip sensing signal sensed by the grip sensor 310, a horizontal sensing signal sensed by the gyro sensor 320, and a temperature sensing signal sensed by the temperature sensor 330.

Referring to FIGS. 11 and 12A, when entering the proximity sensing mode, the threshold value setter circuit 1481 may select the first threshold value Th_1 among the first to k-th threshold values Th_1 to Th_k in an initial entry period and may provide the first threshold value Th_1 to the comparator 1482. Then, the threshold value setter circuit 1481 may receive the grip sensing signal from the grip sensor 310 at a first time point ta. That is, the grip sensing signal may be activated when the user grips a mobile phone. The threshold value setter circuit 1481 may recognize that an intermediate entry period starts at the first time point ta, may select the second threshold value Th_2 lower than the first threshold value Th_1, and may provide the second threshold value Th_2 to the comparator 1482.

Then, the threshold value setter circuit 1481 may receive the horizontal sensing signal from the gyro sensor 320 at a second time point tb. As an example, the horizontal sensing signal may be activated when the user sets the display device 1000 in a position such that the display device 1000 is not parallel to the ground. The threshold value setter circuit 1481 may recognize that the proximity sensing period starts at the second time point tb, may select the third threshold value Th_3 lower than the second threshold value Th_2, and may provide the third threshold value Th_3 to the comparator 1482.

Accordingly, the comparator 1482 may compare the first threshold value Th_1 with first and second result signals RS1 and RS2 during the initial entry period to determine whether the object is in proximity, and may compare the second threshold value Th_2 with the first and second result signals RS1 and RS2 during the intermediate entry period to determine whether the object is in proximity. That is, in the initial entry period where a probability of proximity approach of the object is low, the first threshold value may be set relatively high to determine the proximity of the object under a conservative condition. Then, in the intermediate entry period where the probability of proximity approach of the object 3000 is higher than the initial entry period, the second threshold value may be set relatively lower than the first threshold value to determine the proximity of the object under an intermediate condition, which is more sensitive than the conservative condition. Since the probability of the proximity approach of the object 3000 is higher in the proximity sensing period than that in the intermediate entry period, the comparator 1482 may determine whether the object is in proximity under a sensitive condition using the third threshold value Th_3 smaller than the second threshold value Th_2.

The comparator 1482 may determine that the proximity approach of the object occurs at a third time point tc where the proximity sensing signal is greater than the third threshold value Th_3 based on the compared result.

As described above, embodiments of the present disclosure may sensitively determine whether the object is in proximity by decreasing the threshold value in a situation where there is a high probability of the proximity approach of the object using the sensors provided in the display device 1000. As a result, a recognition rate for the proximity of the object may be improved, and the proximity sensing reliability may be improved.

Referring to FIGS. 11 and 12B, as a time of use of the display device 1000 elapses from a start time point t0 at which the proximity sensing mode starts, a device temperature of the display device 1000 may gradually rise. As an example, the device temperature may rise when the user is on a call or playing games for a long time. The threshold value setter circuit 1481 may periodically receive the temperature sensing signal, which corresponds to the device temperature of the display device 1000, from the temperature sensor 330.

As an example, the level of the proximity sensing signal may increase as the temperature rises. The threshold value setter circuit 1481 may compare the temperature sensing signal with a predetermined reference value and may adjust the threshold value according to the compared result. As an example, a plurality of reference values may be set in the threshold value setter circuit 1481. The threshold value setter circuit 1481 may compare the temperature sensing signal with a first reference value among the reference values, and may maintain the first threshold value Th_1 as it is without adjusting the threshold value when the temperature sensing signal is lower than the first reference value.

Then, in a first time point ta1 at which the temperature sensing signal exceeds the first reference value, the threshold value setter circuit 1481 may change the first threshold value Th_1 to the second threshold value Th_2. In this case, the second threshold value Th_2 may be greater than the first threshold value Th_1.

In a case in which the display device 1000 is continuously used after the first time point ta1, the temperature sensing signal may exceed a second reference value. The threshold value setter circuit 1481 may change the second threshold value Th_2 into the third threshold value Th_3 at a second time point ta2 at which the temperature sensing signal exceeds the second reference value. In this case, the third threshold value Th_3 may be greater than the second threshold value Th_2.

As described above, as the threshold value is adjusted according to the characteristics of the proximity sensing signal that varies according to the temperature by using the temperature sensor provided in the display device 1000, the proximity of the object may be accurately determined even when the temperature changes. As a result, the proximity sensing reliability may be improved.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A display device, comprising:
   a display panel that displays an image;
   an input sensor disposed on the display panel, wherein the input sensor operates in an input sensing mode or a proximity sensing mode;
   a sensor controller that drives the input sensor in the input sensing mode or the proximity sensing mode; and
   a main controller controlling driving of the sensor controller,
   wherein the input sensor comprises a sensing area and a non-sensing area,
   the sensing area is divided into a proximity sensing area and a plurality of reference areas in the proximity sensing mode,
   the main controller generates a noise control signal based on a plurality of reference sensing signals sensed in the reference areas,
   the noise control signal is in an on-state which indicates that a noise is present or an off-state which indicates that the noise is not present, and
   the main controller determines whether an object is in proximity based on an initial threshold value and a proximity sensing signal when the noise control signal is in the off-state,
   the main controller determines whether an object is in proximity based on a change threshold value different from the initial threshold value and a proximity sensing signal sensed in the proximity sensing area when the noise control signal is in the on state.

2. The display device of claim 1, wherein the main controller comprises:
   a processor that processes the proximity sensing signal and outputs a result signal;
   a noise controller that processes the reference sensing signals and outputs the noise control signal; and
   a determiner circuit that determines whether the object is in proximity based on the result signal and the noise control signal.

3. The display device of claim 2, wherein the noise controller processes the reference sensing signals to determine whether a noise is present and outputs the noise control signal having a value that varies depending on whether the noise is present or not.

4. The display device of claim 3, wherein the determiner circuit comprises:
   a threshold value setter circuit that changes a threshold value based on the noise control signal; and
   a comparator that determines whether the object is in proximity by comparing the threshold value with the result signal.

5. The display device of claim 2, wherein the noise controller determines a level of a noise by processing the reference sensing signals, and outputs one of a plurality of noise control signals set according to the level of the noise.

6. The display device of claim 5, wherein the determiner circuit comprises:
   a threshold value setter circuit that selects one of a plurality of threshold values set based on the output noise control signal; and
   a comparator that determines whether the object is in proximity by comparing the selected threshold value with the result signal.

7. The display device of claim 2, wherein the processor comprises:
   an absolute intensity processor that outputs a first result signal by calculating the proximity sensing signal; and
   a relative intensity processor that differentiates a noise prediction value from the proximity sensing signal, and outputs a second result signal obtained by removing a noise from the proximity sensing signal.

8. The display device of claim 1, wherein the input sensor comprises:
   a plurality of first sensing electrodes arranged in a first direction and extending in a second direction; and
   a plurality of second sensing electrodes arranged in the second direction and extending in the first direction,
   wherein the sensor controller receives sensing signals from the second sensing electrodes.

9. The display device of claim 8, wherein the sensing area is divided into the proximity sensing area and the reference areas in the second direction, and each of the reference areas has a size equal to or smaller than a size of the proximity sensing area.

10. The display device of claim 9, wherein the reference areas have a same size as each other.

11. The display device of claim 1, further comprising:
    a sensor module comprising a plurality of sensors,
    wherein the main controller receives an external sensing signal from the sensor module, and the received external sensing signal is used to determine whether the object is in proximity.

12. The display device of claim 11, wherein the sensor module further comprises at least one of a grip sensor that outputs a grip sensing signal, a gyro sensor that outputs a horizontal sensing signal, and a temperature sensor that outputs a temperature sensing signal.

13. The display device of claim 12, wherein the main controller comprises:
    a processor that outputs a result signal by processing the proximity sensing signal; and
    a determiner circuit that determines whether the object is in proximity based on the external sensing signal and the result signal.

14. The display device of claim 13, wherein the determiner circuit comprises:
    a threshold value setter circuit that selects one threshold value corresponding to the external sensing signal among a plurality of threshold values; and
    a comparator that compares the selected threshold value with the result signal.

15. A display device, comprising:
    a display panel that displays an image;
    an input sensor disposed on the display panel, wherein the input sensor operates in an input sensing mode or a proximity sensing mode;
    a sensor controller that drives the input sensor in the input sensing mode or the proximity sensing mode;
    a main controller controlling driving of the sensor controller,
    wherein the input sensor comprises a sensing area and a non-sensing area,
    the sensing area is divided into a proximity sensing area and a plurality of reference areas in the proximity sensing mode, and
    the main controller generates a noise control signal based on a plurality of reference sensing signals sensed in the reference areas, and determines whether an object is in proximity based on the noise control signal and a proximity sensing signal sensed in the proximity sensing area; and a sensor module comprising a plurality of sensors, wherein the main controller receives an external sensing signal from the sensor module, and the received external sensing signal is used to determine whether the object is in proximity.

16. The display device of claim 15, wherein the sensor module further comprises at least one of a grip sensor that outputs a grip sensing signal, a gyro sensor that outputs a horizontal sensing signal, and a temperature sensor that outputs a temperature sensing signal.

17. The display device of claim 16, wherein the main controller comprises:

a processor that outputs a result signal by processing the proximity sensing signal; and a determiner circuit that determines whether the object is in proximity based on the external sensing signal and the result signal.

18. The display device of claim 17, wherein the determiner circuit comprises:

a threshold value setter circuit that selects one threshold value corresponding to the external sensing signal among a plurality of threshold values; and a comparator that compares the selected threshold value with the result signal.

* * * * *